(12) United States Patent
Kim et al.

(10) Patent No.: US 12,167,333 B2
(45) Date of Patent: Dec. 10, 2024

(54) METHOD FOR TRANSMITTING/RECEIVING INFORMATION USING WUR

(71) Applicants: HYUNDAI MOTOR COMPANY, Seoul (KR); KIA CORPORATION, Seoul (KR); KOREA NATIONAL UNIVERSITY OF TRANSPORTATION INDUSTRY-ACADEMIC COOPERATION FOUNDATION, Chungju-si (KR)

(72) Inventors: Yong Ho Kim, Incheon (KR); Han Seul Hong, Seoul (KR)

(73) Assignees: HYUNDAI MOTOR COMPANY, Seoul (KR); KIA CORPORATION, Seoul (KR); KOREA NATIONAL UNIVERSITY OF TRANSPORTATION INDUSTRY-ACADEMIC COOPERATION FOUNDATION, Chungju-si (KR)

( * ) Notice: Subject to any disclaimer, the term of this patent is extended or adjusted under 35 U.S.C. 154(b) by 371 days.

(21) Appl. No.: 17/771,422

(22) PCT Filed: Oct. 23, 2020

(86) PCT No.: PCT/KR2020/014600
§ 371 (c)(1),
(2) Date: Apr. 22, 2022

(87) PCT Pub. No.: WO2021/080381
PCT Pub. Date: Apr. 29, 2021

(65) Prior Publication Data
US 2022/0369229 A1 Nov. 17, 2022

(30) Foreign Application Priority Data

Oct. 25, 2019 (KR) .................. 10-2019-0134069
Oct. 25, 2019 (KR) .................. 10-2019-0134090

(51) Int. Cl.
*H04W 52/02* (2009.01)
*H04W 4/40* (2018.01)

(52) U.S. Cl.
CPC ... *H04W 52/0229* (2013.01); *H04W 52/0261* (2013.01); *H04W 4/40* (2018.02)

(58) Field of Classification Search
CPC ......... H04W 52/0229; H04W 52/0261; H04W 4/40; H04W 52/02; H04W 84/12;
(Continued)

(56) References Cited

U.S. PATENT DOCUMENTS 10,897,739 B2   1/2021   Kim
11,553,426 B2   1/2023   Kim
(Continued)

FOREIGN PATENT DOCUMENTS

| CN | 109863811 A | 6/2019 |
| KR | 20190062318 A | 6/2019 |
| WO | 2019107931 A1 | 6/2019 |

OTHER PUBLICATIONS

Maeda, Tadashi, et al. "Low-power-consumption direct-conversion CMOS transceiver for multi-standard 5-GHz wireless LAN systems with channel bandwidths of 5-20 MHz." IEEE journal of solid-state circuits 41.2 (2006): 375-383 (Year: 2006).*
(Continued)

*Primary Examiner* — Sharad Rampuria
(74) *Attorney, Agent, or Firm* — Lempia Summerfield Katz LLC

(57) ABSTRACT

Disclosed is a method for transmitting/receiving information using WUR. A communication node comprises: a processor;
(Continued)

a memory containing one or more instructions executed by the processor; a first transceiver operating on the basis of the one or more instructions; and a second transceiver operating on the basis of the one or more instructions.

16 Claims, 16 Drawing Sheets

(58) Field of Classification Search
CPC ............ H04W 28/06; H04W 52/0245; H04W 52/0248; H04W 52/028; H04W 52/0222; Y02D 30/70; G08G 1/01; G08G 1/0967; G08G 1/0968; G08G 1/0141; G08G 1/096791; G08G 1/096855; G08G 1/096883
See application file for complete search history.

(56) References Cited

U.S. PATENT DOCUMENTS

| | | | |
|---|---|---|---|
| 2016/0142974 A1* | 5/2016 | Lindoff | H04W 56/00 370/311 |
| 2018/0262865 A1* | 9/2018 | Lepp | G08G 1/166 |
| 2018/0359705 A1* | 12/2018 | Kukosa | H04W 52/0274 |
| 2019/0096243 A1* | 3/2019 | Doig | G08G 1/09 |
| 2019/0110250 A1 | 4/2019 | Huang et al. | |
| 2019/0191372 A1 | 6/2019 | Murali et al. | |
| 2019/0191376 A1 | 6/2019 | Kim | |
| 2020/0178177 A1* | 6/2020 | Kim | H04W 80/02 |
| 2021/0092678 A1 | 3/2021 | Kim | |

OTHER PUBLICATIONS

Oller, Joaquim, et al. "Has time come to switch from duty-cycled MAC protocols to wake-up radio for wireless sensor networks?." IEEE/ACM Transactions on Networking 24.2 (2015): 674-687. (Year: 2015).*

Alan Jauh et al., Multi-Band Opinion, Unisoc; IEEE 802.11-19/0760r1, May 9, 2019; 16 pp.

International Search Report and Written Opinion cited in corresponding international app No. PCT/KR2020/014600; Jan. 26, 2021; 11 pp.

Po-Kai Huang, Comment Resolution for WUR Power Management and Negotiation Part I, Intel Corporation, IEEE 802.11-19/0591r2, May 13, 2019; 20 pp.

* cited by examiner

METHOD FOR TRANSMITTING/RECEIVING INFORMATION USING WUR

CROSS-REFERENCE TO RELATED APPLICATION

This application is a U.S. national stage of International Application No. PCT/KR2020/014600, filed on Oct. 23, 2020, which claims priority to Korean Patent Application No. 10-2019-0134090, filed on Oct. 25, 2019 and Korean Patent Application No. 10-2019-0134069, filed on Oct. 25, 2019, the entire contents of which are incorporated herein by reference.

BACKGROUND

Technical Field

The present disclosure relates to a wireless local area network (LAN) communication technique, and more particularly, to a technique for transmitting and receiving information (e.g., wireless charging information, intelligent transportation system (ITS) information) by using a wake-up radio (WUR).

Background Art

Recently, as the spread of mobile devices has been expanded, a wireless LAN technology capable of providing fast wireless Internet services has been in the spotlight. The wireless LAN technology is a technology that enables mobile devices, such as smart phones, smart pads, laptop computers, portable multimedia players, and embedded devices, to wirelessly access the Internet in a short distance based on wireless communication technologies. Since most devices using the wireless LAN technology are battery-powered devices, low-power operation methods are required to operate for a long time. For the low-power operations, a low-power receiver that receives simple radio signals may be used with a primary transceiver. The low-power receiver may operate with low power. In a specific time period, the low-power receiver may operate in an on-state, and the primary transceiver may operate in an off-state.

Meanwhile, an intelligent transportation system (ITS) may be used to ensure safe driving of a vehicle and to provide driving-related information. The ITS may support communications between a roadside unit (RSU) and a vehicle and/or communications between vehicles by using communication technology. Here, the wireless LAN technology (e.g., IEEE 802.11p, IEEE 802.11bd) may be used as the communication technology.

A terminal supporting ITS (hereinafter referred to as 'ITS terminal') may be located in a vehicle. In addition, a pedestrian may possess an ITS terminal, and a person using a means of transportation (e.g., bicycle) may possess an ITS terminal. Safe driving and/or walking can be ensured by using the ITS terminal. However, in order to support long-distance communications in the ITS, a signal may be transmitted using high power. In this case, the operating time of the low-power receiver operating at low power may be reduced.

When the low-power operation method is supported in the ITS, the operating time of the low-power receiver may increase. However, configuration of a physical channel to which the ITS is applied may be different from that of a physical channel to which the low-power operation method is applied, and communication procedures may also be different due to the different physical channels. Accordingly, there are problems to be solved in order to support the low-power operation method in the ITS. In particular, when channels for transmitting a message including safety information (hereinafter, referred to as 'safety message') are limitedly configured and when the number of vehicles (e.g., ITS terminals located in the vehicles) using the channels is large, a probability of occurrence of a collision in the corresponding channels may increase. In this case, the number of vehicles failing to receive the safety message increases, and accordingly a dangerous situation may occur.

When the low-power operation method is supported in the ITS, an ITS terminal located in a vehicle may transmit a wake-up frame for waking up an ITS terminal carried by a pedestrian and then transmit a message (e.g., safety message) to the ITS terminal carried by the pedestrian. When there are a large number of vehicles, the occupancy of the channel may increase because a large number of wake-up frames are transmitted.

Matters described as the prior arts are prepared to promote understanding of the background of the present disclosure and may include matters that are not already known to those of ordinary skill in the technology domain to which the present disclosure belong.

SUMMARY

Technical Problem

The present disclosure is directed to providing a method and an apparatus for transmitting and receiving information in a wireless local area network (LAN) system by using a wake-up radio (WUR).

Technical Solution

A first communication node according to a first embodiment of the present disclosure may comprise a processor, a memory storing one or more instructions executable by the processor, a first transceiver operating based on the one or more instructions, and a second transceiver operating based on the one or more instructions. An operation bandwidth of the first transceiver is wider than an operation bandwidth of the second transceiver. In a low-power mode, the first transceiver operates in an off-state and the second transceiver operates in an on-state, the second transceiver operates in an on-state, and the second transceiver is used to support the low-power mode.

The one or more instructions may be executed to perform a monitoring operation using the second transceiver within a time window and to transmit a first wake-up frame using the second transceiver when a second wake-up frame of a second communication node is not received by the monitoring operation.

The time window may be configured through negotiation between the first communication node and the second communication node.

The one or more instructions may be executed to perform a monitoring operation using the second transceiver within a time window and to transmit a data frame using the first transceiver without transmitting a first wake-up frame of the first communication node when a second wake-up frame of a second communication node is received by the monitoring operation.

When the second wake-up frame is a valid wake-up frame, the transmission of the first wake-up frame may be omitted. The valid wake-up frame is a wake-up frame for waking up a third communication node, which is a destination of receiving the data frame.

A criterion for determining the valid wake-up frame may be a reception strength of the second wake-up frame.

The one or more instructions may be executed to perform a monitoring operation using the second transceiver within a time window and to transmit a first wake-up frame using the second transceiver to wake up a third communication node when a second wake-up frame of a second communication node received by the monitoring operation is not a valid wake-up frame for waking up the third communication node.

A first channel on which the first transceiver operates may be different from a second channel on which the second transceiver operates.

The one or more instructions may be executed to transmit, to a second communication node, a wake-up request frame by using the first transceiver. The wake-up request frame includes an information element indicating one or more channels supported by the second transceiver. The one or more instructions may be further executed to receive, from the second communication node by using the first transceiver, a wake-up response frame including an information element indicating a first channel on which a wake-up frame is transmitted. The first channel indicated by the wake-up response frame is one of the one or more channels.

The one or more instructions may be further executed to perform a monitoring operation on the first channel using the second transceiver to receive the wake-up frame.

The one or more instructions may be executed to receive a wake-up request frame from the second communication node through the first transceiver. The wake-up request frame includes an information element indicating one or more channels supported by the second communication node. The one or more instructions may be further executed to determine a first channel among the one or more channels indicated by the wake-up request frame as a channel used for transmission of a wake-up frame.

The one or more instructions may be further executed to transmit a wake-up response frame including an information element indicating the first channel to the second communication node by using the first transceiver.

The one or more instructions may be further executed to transmit the wake-up frame in the first channel by using the second transceiver.

The wake-up frame may include intelligent transportation system (ITS) information.

The wake-up frame may include a legacy preamble and a payload, a bandwidth over which the legacy preamble is transmitted may be 20 MHz, and a bandwidth over which the payload is transmitted may be less than 20 MHz.

The one or more instructions may be executed to generate a wake-up frame including state of charge (SoC) level information; transmit the wake-up frame to a second communication node by using the second transceiver and to transmit a data frame to the second communication node by using the first transceiver.

The data frame may be transmitted when a poll frame indicating that the second communication node operates in a wake-up state is received.

The poll frame may indicate that a vehicle in which the second communication node is located operates in a sleep state or wake-up state.

The one or more instructions may be executed to: receive a wake-up frame from a second communication node through the second transceiver; compare an SoC level indicated by the wake-up frame with a battery charge level of a vehicle in which the first communication node is located; and, when the battery charge level is below the SoC level, operate the first transceiver in the on-state.

The one or more instructions may be further executed to transmit a poll frame indicating that the first transceiver operates in the on-state to the second communication node.

When the battery charge level exceeds the SoC level, the first transceiver may maintain the off-state.

Advantageous Effects

According to the present disclosure, in the wake-up procedure, the access point may perform a procedure for identifying the operation state of the station when a response to a data frame is not received. In this case, it can be prevented that the wake-up procedure is restarted from the beginning. In addition, when it is agreed that a poll frame is transmitted in response to a wake-up frame, delay in the wake-up procedure and/or communication procedure can be prevented. Accordingly, power consumption of the station can be reduced.

Meanwhile, in the wake-up procedure, the access point (or, communication node located in a vehicle) may identify whether a wake-up frame has been transmitted by another communication node. When a wake-up frame has not been transmitted by another communication node, the access point may transmit a wake-up frame. In this case, redundant transmissions of wake-up frames may be prevented, and accordingly an increase in channel occupancy can be prevented. In particular, when there are a large number of vehicles, an increase in channel congestion due to transmission of a large number of wake-up frames can be prevented. Accordingly, a probability of occurrence of a collision in the corresponding channel may be reduced, and communication can be performed reliably.

DETAILED DESCRIPTION

Figure 1:
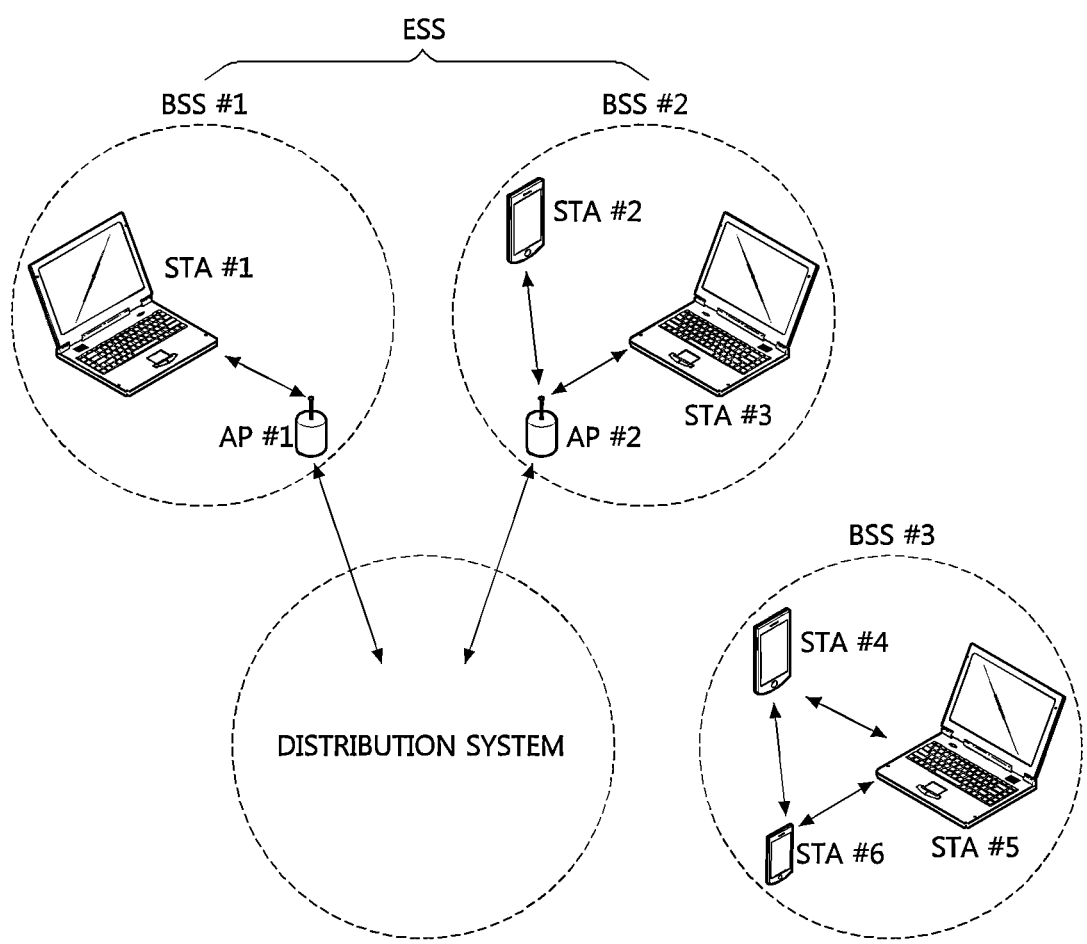
FIG. 1 is a conceptual diagram illustrating a first embodiment of a wireless local area network (LAN)-based communication system.

Since the present disclosure may be variously modified and have several forms, specific embodiments are shown in the accompanying drawings and are described in detail in the detailed description. It should be understood, however, that it is not intended to limit the present disclosure to the specific embodiments. On the contrary, the present disclosure is to cover all modifications and alternatives falling within the spirit and scope of the present disclosure.

Relational terms such as first, second, and the like may be used for describing various elements, but the elements should not be limited by the terms. These terms are only used to distinguish one element from another. For example, a first component may be named a second component without departing from the scope of the present disclosure, and the second component may also be similarly named the first component. The term "and/or" means any one or a combination of a plurality of related and described items.

When it is mentioned that a certain component is "coupled with" or "connected with" another component, it should be understood that the certain component is directly "coupled with" or "connected with" to the other component or a further component may be disposed therebetween. In contrast, when it is mentioned that a certain component is "directly coupled with" or "directly connected with" another component, it should be understood that a further component is not disposed therebetween.

The terms used in the present disclosure are only used to describe specific embodiments and are not intended to limit the present disclosure. The singular expression includes the plural expression unless the context clearly dictates otherwise. In the present disclosure, terms such as 'comprise' or 'have' are intended to designate that a feature, number, step, operation, component, part, or combination thereof described in the specification exists, but it should be understood that the terms do not preclude existence or addition of one or more features, numbers, steps, operations, components, parts, or combinations thereof.

Unless otherwise defined, all terms (including technical and scientific terms) used herein have the same meaning as commonly understood by one of ordinary skill in the art to which this disclosure belongs. Terms that are generally used and have been in dictionaries should be construed as having meanings matched with contextual meanings in the art. In this description, unless defined clearly, terms are not necessarily construed as having formal meanings.

Hereinafter, forms of the present disclosure are described in detail with reference to the accompanying drawings. In describing the disclosure, to facilitate the entire understanding of the disclosure, like numbers refer to like elements throughout the description of the figures and the repetitive description thereof has been omitted.

In the following, a wireless communication system to which embodiments according to the present disclosure are applied is described. The wireless communication system to which the embodiments according to the present disclosure are applied is not limited to the content described below, and the embodiments according to the present disclosure may be applied to various wireless communication systems. The wireless communication system may be referred to as 'wireless communication network'.

FIG. 1 is a conceptual diagram illustrating a first embodiment of a wireless local area network (LAN)-based communication system.

As shown in FIG. 1, a wireless LAN-based communication system according to the IEEE 802.11 standard may include at least one basic service set (BSS). The BSS may indicate a set of communication nodes (e.g., access points #1-2, stations #1-6, etc.). The BSS may be classified into an infrastructure BSS and an independent BSS (IBSS). Here, each of BSSs #1-2 may be an infrastructure BSS, and the BSS #3 may be an IBSS.

The BSS #1 may include a station #1, an access point #1 connected to a distribution system, and the like. Also, the BSS #1 may further include the distribution system. The communications between the station #1 and the access point #1 may be performed based on the IEEE 802.11 standard in the BSS #1. The BSS #2 may include a station #2, a station #3, an access point #2 connected to a distribution system, and the like. Also, the BSS #2 may further include the distribution system. The communications between the station #2 and the access point #2, the communications between the station #3 and the access point #2, and the like may be performed based on the IEEE 802.11 standard in the BSS #2. The communications between stations (e.g., stations #1-3) in the BSS #1 or BSS #2 may be performed through the access point (e.g., access points #1-2). However, when a direct link is established between stations (e.g., station #1-3), direct communications between the stations (e.g., station #1-3) may be performed.

The BSS #3 may be an IBSS operating in an ad-hoc mode. There may not be an access point which is an entity that performs a management function in the BSS #3. In the BSS #3, stations (e.g., stations #4-6) may be managed in a distributed manner. The stations (e.g., stations #4-6) may form a self-contained network since connections to the distribution system are not allowed in the BSS #3.

The plurality of BSSs (e.g., BSSs #1-2) may be interconnected via the distribution system. The plurality of BSSs connected through the distribution system may be referred to as an extended service set (ESS). The communication nodes (e.g., access points #1-2, stations #1-3) included in the ESS may communicate with each other, and stations (e.g., station #1-3) belonging to the same ESS may move between BSSs (e.g., BSSs #1-2) while performing seamless communications.

The communication node (e.g., access point, station, etc.) belonging to the wireless LAN-based communication system may be configured as follows.

Figure 2:
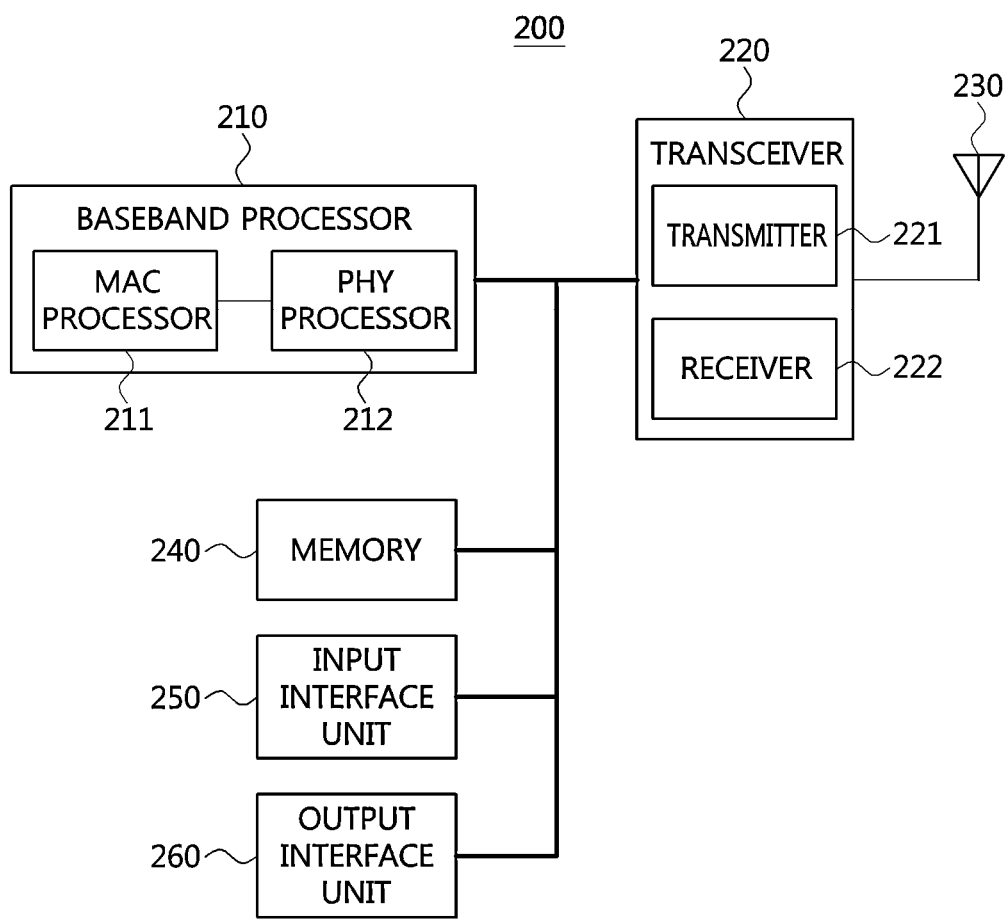
FIG. 2 is a block diagram illustrating a first embodiment of a communication node belonging to a wireless LAN-based communication system.

FIG. 2 is a block diagram illustrating a first embodiment of a communication node belonging to a wireless LAN-based communication system.

As shown in FIG. 2, a communication node 200 may include a baseband processor 210, a transceiver 220, an antenna 230, a memory 240, an input interface unit 250, an output interface unit 260, and the like. The baseband processor 210 may perform baseband-related signal processing and may include a medium access control (MAC) processor 211 and a Physical Layer (PHY) processor 212. The MAC processor 211 may perform functions of the MAC layer defined in the IEEE 802.11 standard and the PHY processor 212 may perform functions of the PHY layer defined in the IEEE 802.11 standard.

The transceiver 220 may include a transmitter 221 and a receiver 222. The transmitter 221 may be used for transmission of an orthogonal frequency division multiplexing (OFDM) signal and/or an on-off keying (OOK) signal for a wake-up radio (WUR). An OFDM modulation function and an OOK modulation function may be implemented by one transmitter 221. The antenna 230 may be configured as an antenna array to support multiple-input multiple-output (MIMO). The memory 240 may store instructions executed by the baseband processor 210 and may comprise at least one of a read only memory (ROM) and a random access memory (RAM). The input interface unit 250 may obtain information from a user of the communication node 200 and the output interface unit 260 may provide information to the user of the communication node 200. The baseband processor 210, the transceiver 220, the memory 240, the input interface unit 250, and the output interface unit 260 may be connected to each other via a bus.

Meanwhile, the communication node (e.g., access point, station, etc.) belonging to the wireless LAN-based communication system may perform transmission and reception of a frame based on a point coordination function (PCF), a hybrid coordination function (HCF), an HCF controlled channel access (HCCA) function, an enhanced distributed channel access (EDCA) function, or the like.

In the wireless LAN-based communication system, a frame may be classified into a management frame, a control frame, and a data frame. The management frame may include an association request frame, an association response frame, a reassociation request frame, a reassociation response frame, a probe request frame, a probe response frame, a beacon frame, a disassociation frame, an authentication frame, a deauthentication frame, an action frame, and the like.

The control frame may include an acknowledgment (ACK) frame, a block ACK request (BAR) frame, a block ACK (BA) frame, a power saving (PS)-Poll frame, a request to send (RTS) frame, a clear to send (CTS) frame, and the like. The data frame may be classified into a quality of service (QoS) data frame and a non-QoS data frame. The QoS data frame may indicate a data frame requiring transmission according to the QoS, and the non-QoS data frame may indicate a data frame not requiring transmission according to the QoS.

Figure 3:
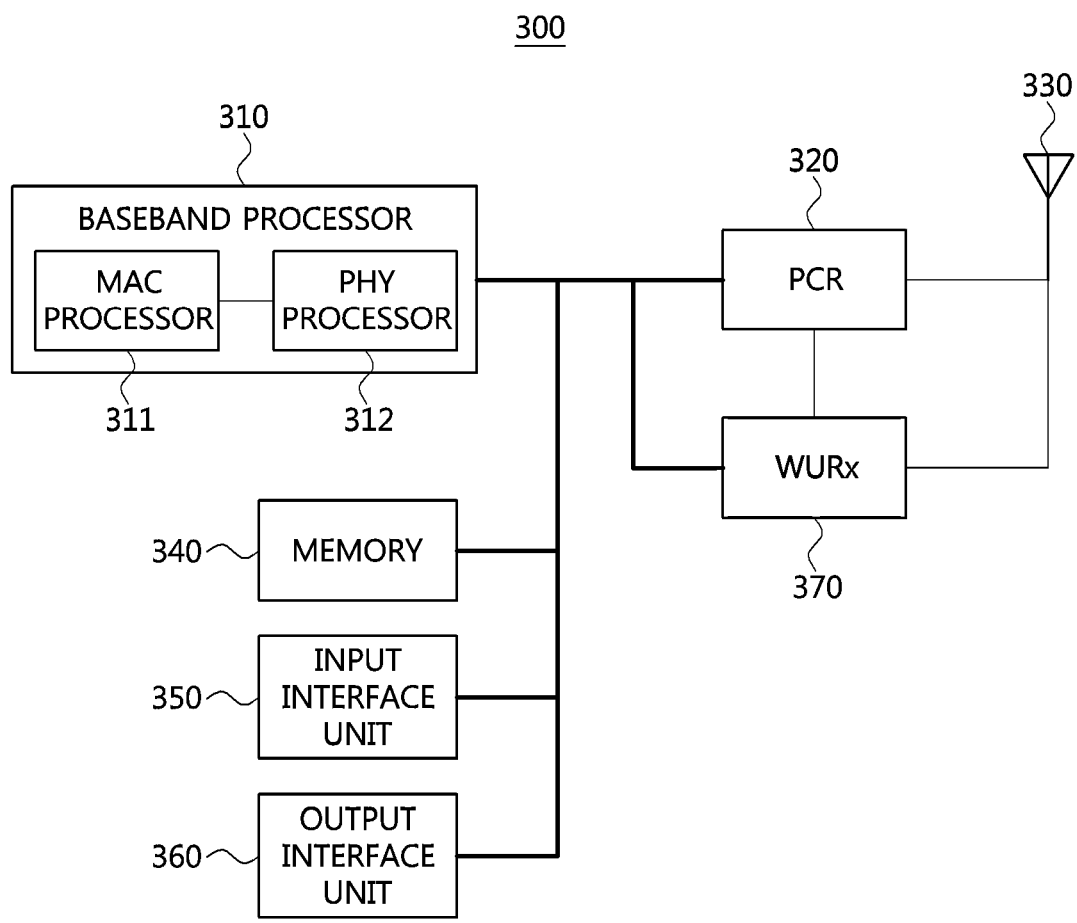
FIG. 3 is a block diagram illustrating a first embodiment of a low-power station in a wireless LAN-based communication system.

FIG. 3 is a block diagram illustrating a first embodiment of a low-power station in a wireless LAN-based communication system.

As shown in FIG. 3, a low-power station 300 may include a baseband processor 310, a primary connectivity radio (PCR) 320, an antenna 330, a memory 340, an input interface unit 350, an output interface unit 360, a wake-up receiver (WURx) 370, and the like. For example, the low-power station 300 may further include the WURx 370 as compared to the communication node 200 of FIG. 2. The WURx 370 may be a device having an OOK demodulator. The low-power station 300 may not include the separate WURx 370. In this case, the PCR 320 may perform a function of the WURx 370 (e.g., OOK demodulation function). The functions of each of the baseband processor 310, the PCR 320, the antenna 330, the memory 340, the input interface unit 350, and the output interface unit 360 included in the low-power station 300 may be the same as or similar to the functions of each of the baseband processor 210, the transceiver 220, the antenna 230, the memory 240, the input interface unit 250, and the output interface unit 260 included in the communication node 200 of FIG. 2.

The PCR 320 of the low-power station 300 may be referred to as a transceiver or primary transceiver, and the WURx 370 of the low-power station 300 may be referred to as a WUR, receiver, auxiliary communicator, or low-power receiver. When the PCR 320 is referred to as a first transceiver, the WURx 370 may be referred to as a second transceiver. Alternatively, when the PCR 320 is referred to as a primary transceiver, the WURx 370 may be referred to as a secondary transceiver. The function of the PCR 320 and the function of the WURx 370 may be implemented in one chip. In this case, the PCR 320 shown in FIG. 3 may be a logical entity performing the function of the PCR 320, and the WURx 370 shown in FIG. 3 may be a logical entity performing the function of the WURx 370. In other words, in embodiments, the operation of the PCR 320 and the operation of the WURx 370 may be interpreted as being implemented in one chip.

The PCR 320 of the low-power station 300 may transmit and receive a non-high throughput (HT) physical protocol data unit (PPDU), HT PPDU, very high throughput (VHT) PPDU, high efficiency (HE) PPDU, extremely high throughput (EHT) PPDU, and the like. The non-HT PPDU, HT PPDU, VHT PPDU, HE PPDU, EHT PPDU, and the like may be referred to as a legacy PPDU (e.g., legacy frame). The WURx 370 of the low-power station 300 may receive a WUR PPDU (e.g., WUR frame).

In other words, the low-power station 300 may be a non-HT station, HT station, VHT station, HE station, EHT station, or the like capable of transmitting and receiving a WUR PPDU. The WURx 370 may be located in the PCR 320 or may be configured independently of the PCR 320. The WURx 370 and the PCR 320 may share the same antenna 330. Alternatively, the antenna for the WURx 370 may be configured separately from the antenna for the PCR 320. For example, the low-power station 300 may include a first antenna (not shown) for the WURx 370 and a second antenna (not shown) for the PCR 320. The communications between the WURx 370 and the PCR 320 may be performed using a primitive signal, a signal according to an application protocol interface (API), or the like.

The WURx 370 may operate in a narrow band (e.g., 4 MHz, 8 MHz, 16 MHz, etc.), and the power consumption of the low-power station 300 including the WURx 370 may be less than 1 mW. The WURx 370 may receive an OOK modulated signal (e.g., WUR wake-up frame) and perform demodulation on the received signal to identify information included in the received signal. The PCR 320 may transmit and receive frames (e.g., control frames, management frames, data frames) defined in the IEEE 802.11 standard and may operate various frequency bands (e.g., the 2.4 GHz frequency band, the 5 GHz frequency band, the 5.9 GHz frequency band, the 6 GHz frequency band, and the 60 GHz frequency band). Also, the PCR 320 may support 20 MHz bandwidth, 40 MHz bandwidth, 80 MHz bandwidth, 160 MHz bandwidth, or the like.

Each of the PCR 320 and the WURx 370 may operate in a wake-up state or a sleep state. The wake-up state may indicate a state in which power is supplied to the corresponding entity (e.g., PCR 320 or WURx 370), and the wake-up state may be referred to as "on-state, "activation-state", "enable state", "awake state", or the like. The sleep state may indicate a state in which no power or a minimum power is supplied to the corresponding entity (e.g., PCR 320 or WURx 370), and the sleep state may be referred to as "off-state", "deactivation-state", "disable state", "doze state", or the like.

The low-power station 300 may operate in a normal mode or a WUR mode. In the normal mode, the PCR 320 of the low-power station 300 may operate in the wake-up state. In this case, the low-power station 300 may operate identically or similarly to the communication node 200 of FIG. 2. In the WUR mode, when the PCR 320 of the low-power station 300 operates in the wake-up state, the WURx 370 of the low-power station 300 may operate in the sleep state. For example, the PCR 320 operating in the wake-up state may perform a transmission and reception procedure of a frame (e.g., legacy frame, legacy signal) with another communication node. On the other hand, when the PCR 320 of the low-power station 300 operates in the sleep state, the WURx 370 of the low-power station 300 may operate in the wake-up state. In this case, the WURx 370 operating in the wake-up state may perform a channel state monitoring operation (e.g., carrier sensing operation) to receive a WUR wake-up frame. Here, the WUR wake-up frame may request the PCR 320 of the low-power station 300 to operate in the wake-up state.

When the low-power station 300 operating in the WUR mode receives the WUR wake-up frame from another communication node, the WURx 370 may transmit to the PCR 320 a wake-up indicator requesting the PCR 320 to operate in the wake-up state. When the wake-up indicator is received from the WURx 370, the operation state of the PCR 320 may transition from the sleep state to the wake-up state. When the wake-up indicator is transmitted to the PCR 320 or when the operation state of the PCR 320 transitions from the sleep state to the wake-up state, the operation state of the WURx 370 may transition from the wake-up state to the sleep state. Alternatively, the operation state of the WURx 370 may transition from the wake-up state to the sleep state when a sleep indicator requesting the WURx 370 to operate in the sleep state is received from the PCR 320. Here, a time required for the PCR 320 to transition from the sleep state to the wake-up state may be referred to as a 'state transition time'. For example, the state transition time may indicate a time from a time point of the reception of the WUR wake-up frame to a time point when the PCR 320 of the low-power station operates in the wake-up state.

When the operation of frame transmission and reception is completed, the operation state of the PCR 320 may transition from the wake-up state to the sleep state. In this case, the PCR 320 may transmit to the WURx 370 a wake-up indicator requesting the WURx 370 to operate in the wake-up state. When the wake-up indicator is received from the PCR 320, the operation state of the WURx 370 may transition from the sleep state to the wake-up state. When the wake-up indicator is transmitted to the WURx 370 or when the operation state of the WURx 370 transitions from the sleep state to the wake-up state, the operation state of the PCR 320 may transition from the wake-up state to the sleep state.

Meanwhile, an access point supporting low-power operations may be configured the same as or similar to the low-power station 300 described above. For example, the access point may include the baseband processor 310, the PCR 320, the antenna 330, the memory 340, the input interface unit 350, the output interface unit 360, the WURx 370, and the like. Also, the access point may include a wake-up transmitter (WUTx) (not shown) instead of the WURx 370 or may include a wake up radio (WUR) that performs the functions of WURx 370 and the WUTx. The WUTx may perform operations corresponding to the WURx 370. For example, WUTx may operate in a narrow band (e.g., 4 MHz, 8 MHz, 16 MHz, etc.). The WUTx may transmit an OOK modulated signal (e.g., WUR wake-up frame). Also, the low-power station 300 may further include a WUTx corresponding to the WURx 370. The access point supporting low-power operations may be a non-HT access point, HT access point, VHT access point, HE access point, EHT access point, or the like.

Figure 4:
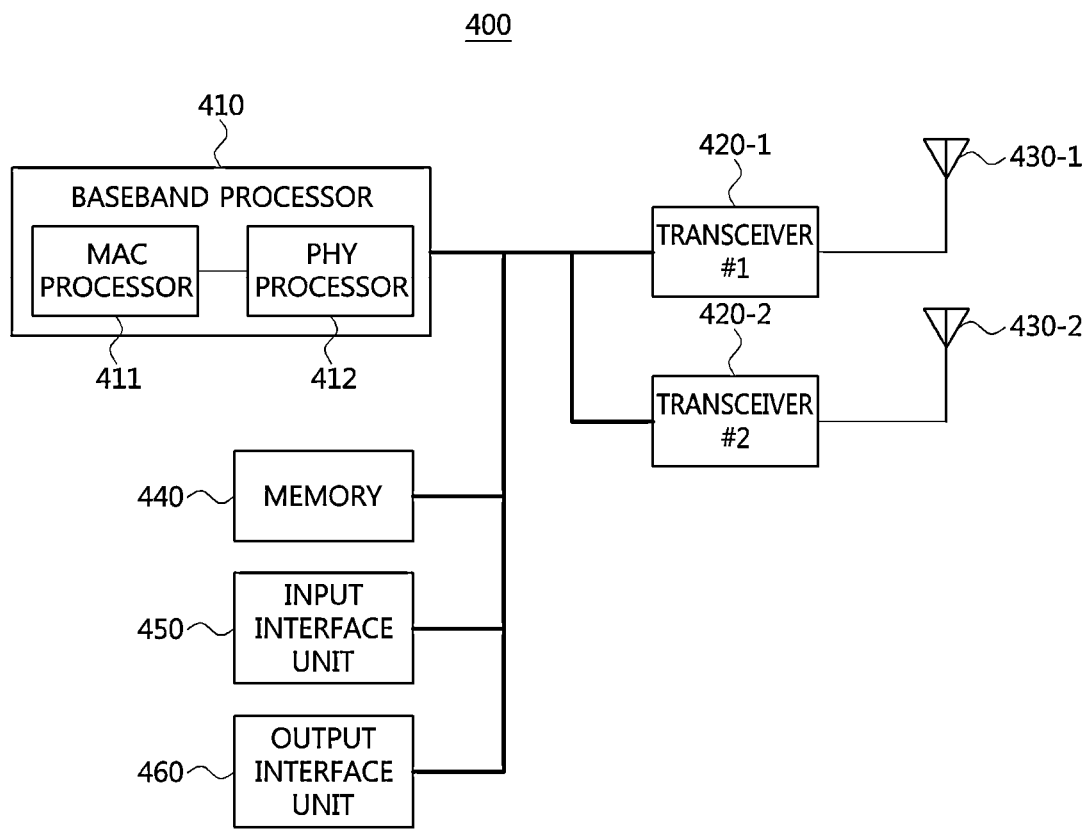
FIG. 4 is a block diagram illustrating a second embodiment of a low-power station in a wireless LAN-based communication system.

FIG. 4 is a block diagram illustrating a second embodiment of a low-power station in a wireless LAN-based communication system.

As shown in FIG. 4, a low-power station 400 may include a baseband processor 410, a transceiver #1 420-1, a transceiver #2 420-2, an antenna #1 430-1, an antenna #2 430-2, a memory 440, an input interface unit 450, an output interface unit 460, and the like. For example, the low-power station 400 may further include the transceiver #2 420-2 and the antenna #2 430-2 as compared to the communication node 200 of FIG. 2. The functions of each of the baseband processor 410, the transceiver #1 420-1, the transceiver #2 420-2, the antenna #1 430-1, the antenna #2 430-2, the memory 440, the input interface unit 450, and the output interface unit 460 included in the low-power station 400 may be the same as or similar to the functions of each of the baseband processor 210, the transceiver 220, the antenna 230, the memory 240, the input interface unit 250, and the output interface unit 260 included in the communication node 200 of FIG. 2. The transceiver #1 420-1 and the transceiver #2 420-2 may be referred to as a PCR #1 and a PCR #2, respectively.

The function of the transceiver #1 420-1 and the function of the transceiver #2 420-2 may be implemented in one chip. In this case, the transceiver #1 420-1 shown in FIG. 4 may be a logical entity performing the function of the transceiver #1 420-1, and the transceiver #2 420-2 shown in FIG. 4 may be a logical entity performing the function of the transceiver #2 420-2. In other words, in embodiments, the operation of the transceiver #1 420-1 and the operation of the transceiver #2 420-2 may be interpreted as being implemented in one chip.

The functions of each of the transceiver #2 420-2 and the antenna #2 430-2 included in the low-power station 400 may be the same as those of the transceiver 220 and the antenna 230 included in the communication node 200 of FIG. 2. Alternatively, the functions of the transceiver #1 420-1 included in the low-power station 400 may be the same as or similar to the functions of the PCR 320 included in the communication node 300 of FIG. 3, and the functions of the transceiver #2 420-2 included in the low-power station 400 may be the same as or similar to the functions of the WURx 370 included in the communication node 300 of FIG. 3. The communication between the transceiver #1 420-1 and the transceiver #2 420-2 may be performed using a primitive signal, a signal according to API, or the like. The low-power station 400 may be a non-HT station, HT station, VHT station, HE station, EHT station, or the like.

An access point supporting low-power operation may be configured to be the same as or similar to the low-power station 400 described above. For example, the access point may include the baseband processor 410, the transceiver #1 420-1, the transceiver #2 420-2, the antenna #1 430-1, the antenna #2 430-2, the memory 440, the input interface unit 450, the output interface unit 460, and the like. The access point supporting low-power operations may be a non-HT access point, HT access point, VHT access point, HE access point, EHT access point, or the like.

Meanwhile, the above-described low-power station may be used in a wireless charging system. In this case, the low-power station may be used to transmit/receive charging-related information while a vehicle is being charged. The wireless charging system including the low-power station may be as follows.

Figure 5:
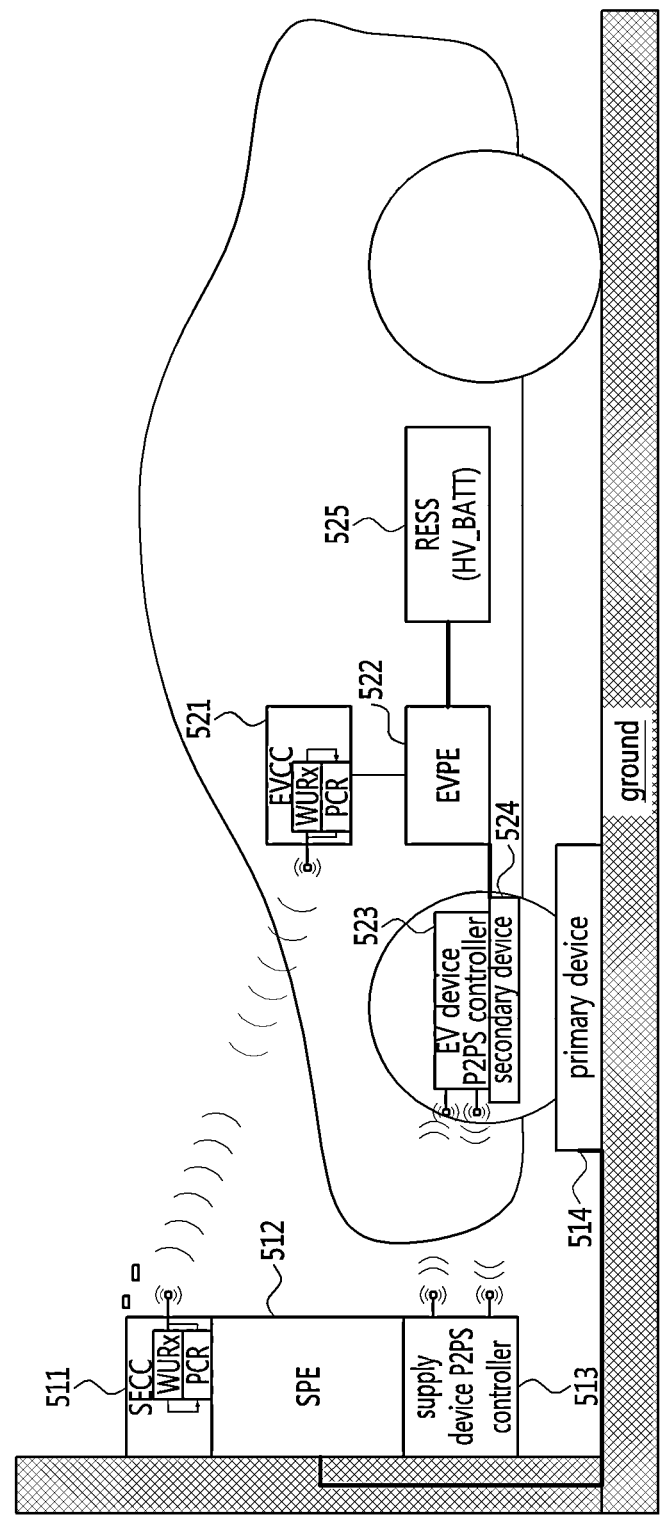
FIG. 5 is a conceptual diagram illustrating a first embodiment of a wireless charging system including a low-power station.

FIG. 5 is a conceptual diagram illustrating a first embodiment of a wireless charging system including a low-power station.

As shown in FIG. 5, the wireless charging system may be referred to as a 'ground assembly (GA)' or a 'supply device'. The wireless charging system may include a supply equipment communication controller (SECC) 511, a supply power electronics (SPE) 512, a supply device point-to-point signal (P2PS) controller 513, and a primary device 514. The low-power station (e.g., PCR and WURx) shown in FIG. 3 or FIG. 4 may be included in the wireless charging system. For example, the PCR and the WURx may be placed within the SECC 511. Here, the WURx may be a WUR supporting functions of a WUTx or functions of a WURx and a WUTx.

The vehicle may include a vehicle assembly (VA). The VA may be referred to as an 'electric vehicle (EV) device'. The VA may include an EV communication controller (EVCC) 521, an EV power electronics (EVPE) 522, an EV device point-to-point signal (P2PS) controller 523, and a secondary device 524. The vehicle may further include a rechargeable energy storage system (RESS) 525 connected to the EVPE 522. The low-power station (e.g., PCR and WURx) shown in FIG. 3 or FIG. 4 may be included in a vehicle (e.g., VA). For example, the PCR and the WURx may be placed within EVCC 521. Here, the WURx may be a WUR supporting functions of a WUTx or functions of a WURx and a WUTx.

When the vehicle is located in the wireless charging system, a wireless charging procedure may be performed. When the wireless charging procedure is performed, the wireless charging system and/or the vehicle may operate in a sleep or low-power state. In other words, in order to prevent discharging of a battery (e.g., low voltage battery) of the vehicle during the wireless charging procedure, the vehicle may operate in the sleep or low-power state. In addition, in order to prevent unnecessary power consumption in the wireless charging system while performing the wireless charging procedure, the wireless charging system may operate in the sleep or low-power state. When the wireless charging system and/or the vehicle is operating in the sleep or low-power state, the low-power station may be used for communications between the wireless charging system and the vehicle. Charging-related information may be exchanged between the wireless charging system and the vehicle using the low-power station. The charging-related information may be included in a frame specified in IEEE 802.11.

The charging-related information may include information indicating a current charging state of the vehicle, information indicating a time remaining until charging is complete, information indicating that charging is being normally performed, information indicating that charging is stopped, information indicating an error occurring during charging, information indicating that charging is resumed, information indicating that charging is impossible, and/or information indicating that charging is completed. When the charging-related information is received through the low-power station, the wireless charging system and/or the vehicle may perform operation(s) according to the corresponding charging-related information. In this case, the wireless charging system and/or the vehicle may operate in a wake-up or normal state.

Meanwhile, in the wireless LAN system, the PCR (e.g., primary transceiver) of the low-power station may operate in the sleep state, and a wake-up frame (e.g., WUR wake-up frame) may be used to wake up the PCR. The wake-up procedure may be performed as follows.

Figure 6:
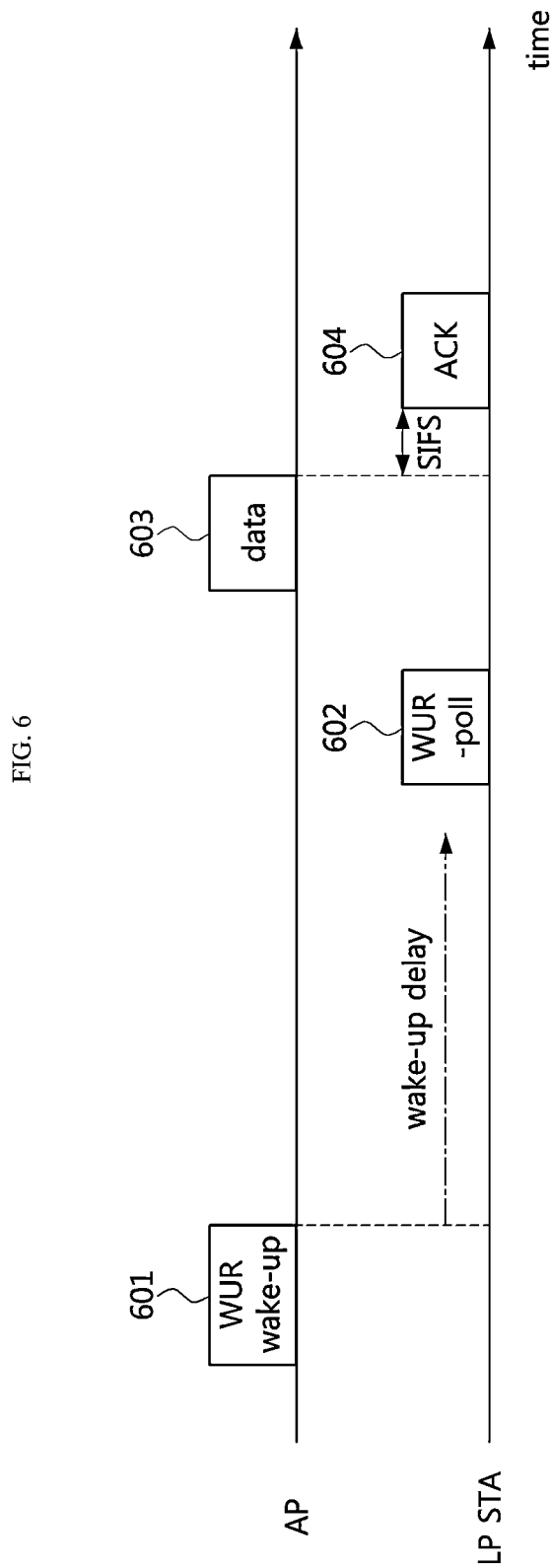
FIG. 6 is a timing diagram illustrating a first embodiment of an operation method of a communication terminal in a wireless LAN system.

FIG. 6 is a timing diagram illustrating a first embodiment of an operation method of a communication terminal in a wireless LAN system.

As shown in FIG. 6, a wireless LAN-based communication system may include an AP, a low-power station (LP STA), and the like. The LP STA may be within a coverage of the AP and may be associated with the AP. The AP and the LP STA may be configured identically or similarly to the low-power station 300 of FIG. 3. In addition, the AP and the LP STA may further include a WUTx compared to the low-power station 300 of FIG. 3. Alternatively, the AP and the LP STA may be configured identically or similarly to the low-power station 400 of FIG. 4. The AP and the LP STA may operate based on the EDCA scheme. The AP may be located in the wireless charging system shown in FIG. 5, and the LP STA may be located in the vehicle shown in FIG. 5.

When the LP STA operates in the WUR mode, the AP may transmit a WUR wake-up frame 601 to wake up the LP STA. For example, the AP may generate the WUR wake-up frame 601 and may transmit the WUR wake-up frame 601 to the LP STA when a channel state is determined to be an idle state in a carrier sensing period. In embodiments below, the carrier sensing period may be a short interframe space (SIFS), PCF IFS (PIFS), DCF IFS (DIFS), arbitration IFS (AIFS), 'DIFS+backoff period', 'AIFS [AC_VO]+backoff [AC_VO] period', 'AIFS [AC_VI]+backoff [AC_VI] period', 'AIFS [AC_BE]+backoff [AC_BE] period', or 'AIFS [AC_BK]+backoff [AC_BK] period'.

The WUR wake-up frame 601 may be used to wake up a vehicle (e.g., VA) operating in a deep sleep state. In this case, the WUR wake-up frame 601 may mean a deep sleep wake-up request (e.g., DeepSleepWake-upReq) frame. The deep sleep state may be a state in which only the WUR is activated, and the sleep state may be a state in which the EVCC 521 is activated. The WUR wake-up frame 601 may include state of charge (SoC) information (e.g., SoC level, SoC value, SoC threshold). The SoC level may indicate a battery charge state of the vehicle. Alternatively, the SoC level may be a reference value for transition of the operation state of the vehicle. For example, when the wireless charging system wants to charge the vehicle, the AP located in the wireless charging system may transmit the WUR wake-up frame 601 to the LP STA located in the vehicle.

The WUR wake-up frame 601 may be configured as follows.

Figure 7:
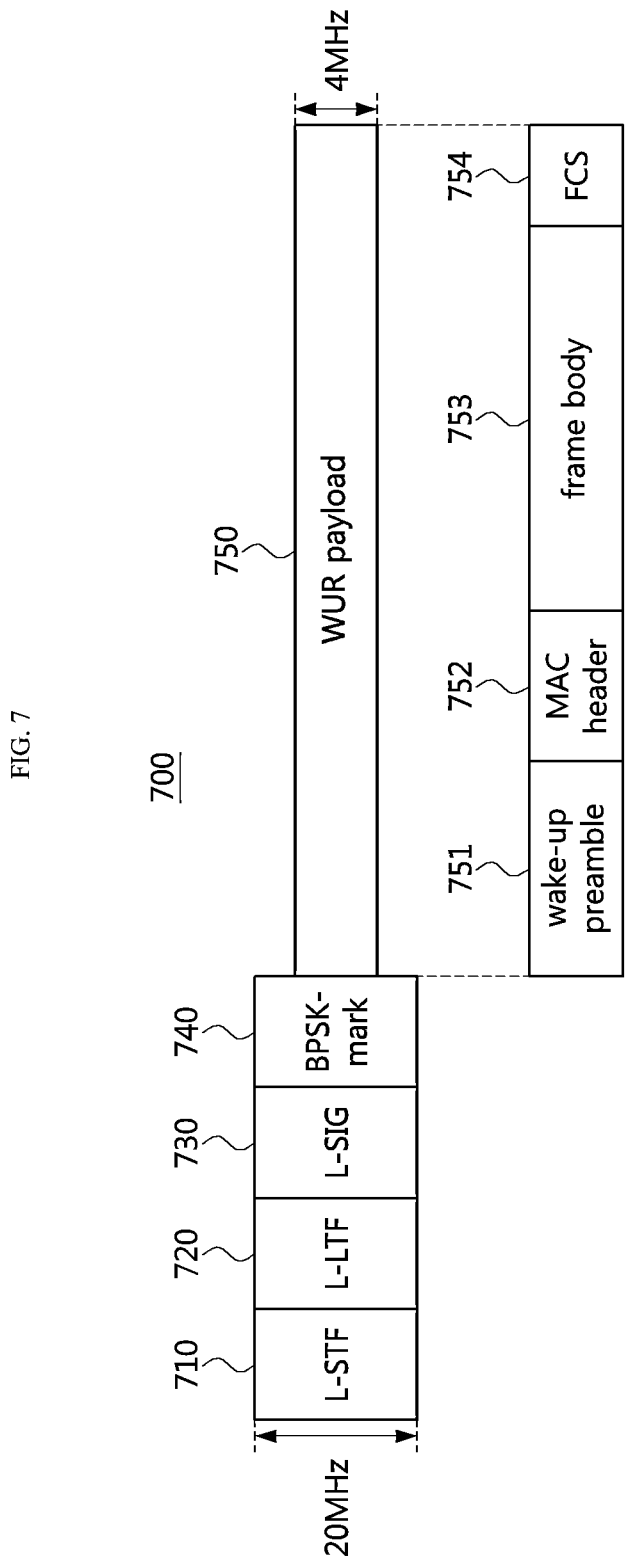
FIG. 7 is a block diagram illustrating a first embodiment of a wake-up radio (WUR) wake-up frame in a wireless LAN system.

FIG. 7 is a block diagram illustrating a first embodiment of a WUR wake-up frame in a wireless LAN system.

As shown in FIG. 7, a WUR wake-up frame 700 may include a legacy preamble and a WUR payload 750. The legacy preamble may include a legacy short training field (L-STF) 710, a legacy long training field (L-LTF) 720, and a legacy signal (L-SIG) field 730. The legacy preamble may be used to inform that a channel is used for a time indicated by an information element included in the corresponding legacy frame. The legacy preamble may be decodable by a legacy station. The size of a frequency band to which the legacy preamble is mapped may be 20 MHz. Alternatively, when the WUR wake-up frame 700 is transmitted in the 5.9

GHz frequency band, the size of the frequency band to which the legacy preamble is mapped may be 10 MHz. Also, the legacy preamble may further include a binary phase-shift keying (BPSK)-mark 740. The BPSK-mark 740 may be configured with one symbol (e.g., orthogonal frequency division multiplexing (OFDM) symbol) modulated by a BPSK scheme. The BPSK-mark 740 may be a BPSK symbol or a BPSK signal.

The BPSK-mark is used to prevent the legacy station (e.g., station supporting IEEE 802.11n) from performing a channel state monitoring operation (e.g., carrier sensing operation, energy detection (ED) operation, etc.) for a signal after the legacy preamble according to an occurrence of a frame error when the WUR wake-up frame 700 is incorrectly determined as another IEEE 802.11 frame. When the legacy station performs the ED operation in a 20 MHz bandwidth according to the error in frame recognition, since a transmission bandwidth the WUR payload 750 is narrow and thus a reception power detected according to the ED operation is low, the legacy station may transmit a frame in a transmission period of the WUR payload 750. To avoid this problem, the BPS K-mark 740 may be used.

The WUR payload 750 may include information element(s) required to wake up a PCR and may be designed to be decodable by a WURx. The WUR payload 750 may be modulated and demodulated based on the OOK scheme. The size of the frequency band to which the WUR payload 750 is mapped may be smaller than 20 MHz. In other words, the WUR payload 750 may be configured as a signal having a narrow band (e.g., 4 MHz frequency band).

The WUR payload 750 may include a wake-up preamble 751, a medium access control (MAC) header 752, a frame body 753, and a frame check sequence (FCS) field 754. The wake-up preamble 751 may include a pseudo-random (PN) sequence used for synchronization between the AP and the LP STA (e.g., WURx included in the LP STA). The PN sequence may indicate a data rate and a bandwidth. The wake-up preamble 751 may mean a WUR sync field or a preprocessing part.

The MAC header 752 may include MAC address field(s). The MAC address field may indicate an identifier (e.g., association identifier (AID)) of the LP STA that is to receive the WUR wake-up frame 700 or a group identifier of LP STAs. The MAC header 752 and/or the frame body 753 may include information element(s) required for the LP STA (e.g., low-power operations, operations according to the WUR mode).

Figure 14:
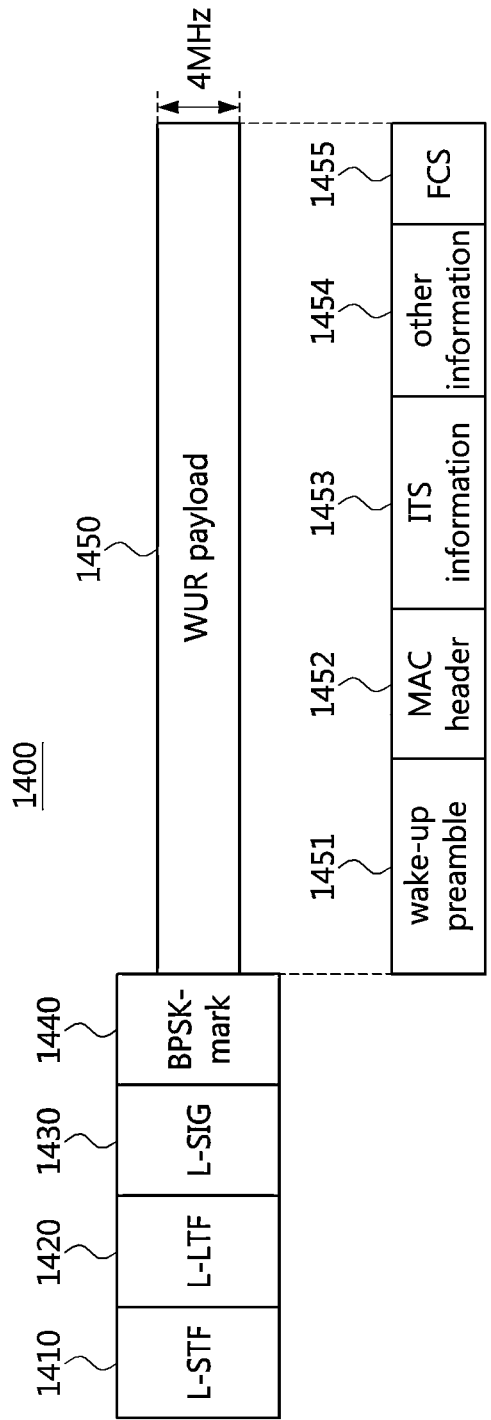
FIG. 14 is a block diagram illustrating a second embodiment of a WUR wake-up frame in a wireless LAN system.

The WUR payload 750 may further include ITS information shown in FIG. 14. The ITS information may include SoC information (e.g., SoC level, SoC value, SoC threshold). Even when a WUR frame of a WUR vendor-specific frame type is transmitted instead of the WUR wake-up frame 700, the same operations may be performed. The WUR frame of the WUR vendor-specific frame type may include the SoC information.

Referring again to FIG. 6, the WUR wake-up frame 601 may be the same as or similar to the WUR wake-up frame 700 of FIG. 7. The AP may transmit the WUR wake-up frame 601. The WURx of the LP STA may receive the WUR wake-up frame 601. When a wake-up target indicated by the WUR wake-up frame 601 (i.e., communication node indicated by the address field) is the LP STA, the WURx may wake up the PCR. In other words, when the WUR wake-up frame 601 is received, the operation state of the PCR of the LP STA may be transitioned from the sleep state to the wake-up state.

When the WUR wake-up frame 601 includes the SoC information, the LP STA may compare the SoC level (e.g., reference value) indicated by the SoC information with a battery charge level (e.g., battery charge stage) of the vehicle. When the battery charge level of the vehicle exceeds the reference value, the operation state of the PCR may maintain the sleep state. In this case, the vehicle may maintain the deep sleep state. On the other hand, when the battery charge level of the vehicle is less than or equal to the reference value, the operation state of the PCR may be transitioned from the sleep state to the wake-up state. In this case, the vehicle may transition from the deep sleep state to the sleep state or the wake-up state. In other words, since battery charging is required when the battery charge level of the vehicle is less than or equal to the reference value, the PCR may operate in the wake-up state, and the vehicle may operate in the sleep state or wake-up state.

The PCR of the LP STA, which operates in the wake-up state, may transmit a WUR-poll frame 602 to the AP. The WUR-poll frame 602 may be transmitted when a channel state is an idle state in a carrier sensing period. The WUR-poll frame 602 may indicate that the operation state of the PCR of the LP STA has been transitioned from the sleep state to the wake-up state. Here, the WUR-poll frame 602 may be a power saving (PS)-poll frame, an unscheduled-automatic power saver delivery (U-APSD) frame, or an arbitrary frame (e.g., null frame). Alternatively, the transmission of the WUR-poll frame may be omitted.

The WUR-poll frame 602 may include information (e.g., SoC information) indicating a current battery charge level of the vehicle in which the LP STA is located. When the WUR-Poll frame 602 is a PS-Poll frame, the WUR-Poll frame 602 may be configured identically to a PS-Poll frame shown in FIG. 15. An ID field included in the PS-Poll frame may be used to indicate the SoC information. For example, reserved bits may be used to indicate the SoC information. Alternatively, if the WUR-poll frame 602 is a null frame (e.g., QoS null frame having no payload), the WUR-poll frame 602 may be configured identically to a QoS null frame shown in FIG. 16. A TID field and reserved bits in a QoS control field included in the QoS null frame may be used to indicate the SoC information.

When the WUR-poll frame 602 is received from the LP STA, the AP may determine that the operation state of the PCR of the LP STA has transitioned from the sleep state to the wake-up state. Also, the AP located in the wireless charging system may determine that the vehicle in which the LP STA is located operates in the sleep state or the wake-up state. The AP may transmit an ACK frame (not shown) to the LP STA in response to the WUR-poll frame 602. The ACK frame may be transmitted after a lapse of a SIFS from an end time of the WUR-poll frame 602. Here, the transmission of the ACK frame in response to the WUR-poll frame 602 may be omitted.

When it is determined that the PCR of the LP STA operates in the wake-up state (e.g., when it is determined that the vehicle in which the LP STA is located operates in the sleep state or the wake-up state), the AP may transmit a data frame 603 to the LP STA. The data frame 603 transmitted from the AP located in the wireless charging system may include charging-related information (e.g., SoC information). The data frame 603 may be transmitted when a channel state is an idle state in a carrier sensing period. The LP STA may receive the data frame 603 from the AP, and when the data frame 603 is successfully received, the LP STA may transmit an ACK frame 604 in response to the data frame 603 to the AP. The ACK frame 604 may be transmitted after a lapse of a SIFS from an end time of the data frame 603. The AP may determine that the data frame 603 has been successfully received at the LP STA when the ACK frame 604 is received.

In the wake-up procedure described above, a wake-up delay may occur from a transmission time of the WUR wake-up frame 601 until the PCR of the LP STA wakes up. In the vehicle wireless charging scenario, the wake-up delay may include a time required for the vehicle to transition from the deep sleep state to the sleep state or wake-up state. If the WUR-Poll frame 602 is not used, the AP may transmit the data frame 603 to the LP STA after the wake-up delay elapses. In particular, when the WUR wake-up frame 601 including a group address is transmitted to wake up a plurality of LP STAs, it may be difficult for the plurality of LP STAs to individually transmit the WUR-poll frame 602. In this case, the data frame 603 may occur. The data frame 603 may be a data frame for each LP STA, LP STAs belonging to a group, or all LP STAs. Here, an address field included in the data frame 603 may indicate an address of one LP STA, a group address, or that a broadcast scheme is used. In the procedure of waking up the plurality of LP STAs, the data frame 603 may be a trigger frame for the WUR-poll frame 602.

Figure 8:
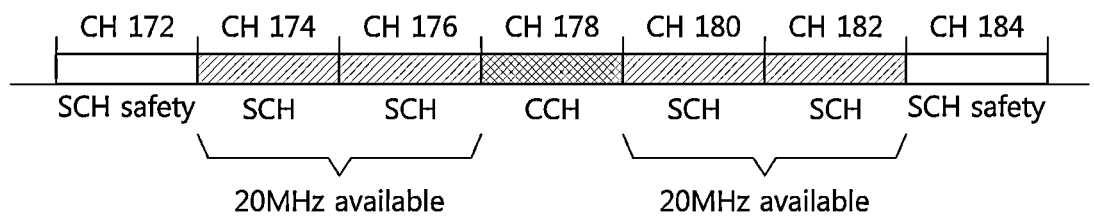
FIG. 8 is a conceptual diagram illustrating a first embodiment of channel configuration in a wireless LAN system.

FIG. 8 is a conceptual diagram illustrating a first embodiment of channel configuration in a wireless LAN system.

As shown in FIG. 8, IEEE 802.11p and/or IEEE 802.11d may support vehicle communications. The vehicle communications may be performed in the 5.9 GHz frequency band. Basic operations in the wireless LAN standards supporting vehicle communications (e.g., IEEE 802.11p and/or IEEE 802.11d) may be similar to operations in wireless LAN standards supporting the 2.4 GHz, 5 GHz, and/or 6 GHz band. The wireless LAN standards supporting vehicle communications may be referred to as 'vehicle wireless LAN standards'. The vehicle wireless LAN standards may be used together with the wireless access in vehicular environments (WAVE) standard and may be designed in consideration of a delay and/or a transmission success probability condition for vehicle communications.

In particular, the vehicle wireless LAN standards may support 'outside context of BSS (OCB) communication', and thus a communication procedure may be simplified in a vehicle communication environment having high mobility. When the OCB communication is supported, a station (e.g., LP STA) may perform direct communications without performing an authentication procedure and/or an association procedure with an AP. In the vehicle wireless LAN standards, a 5 MHz frequency bandwidth, a 10 MHz frequency bandwidth, and/or a 20 MHz frequency bandwidth may be supported for frame transmission. The 20 MHz frequency bandwidth may be a frequency bandwidth used in the existing wireless LAN standards.

When a preamble signal (e.g., L-STF, L-LTF, L-SIG field, etc.) using a frequency band having a width of 20 MHz is to be transmitted in a frequency band having a width of 5 MHz or 10 MHz, a length of symbols (e.g., number of symbols) required for transmission of a preamble signal in a frequency band having a width of 5 MHz or 10 MHz may be longer than a length of symbols (e.g., number of symbols) required for transmission of a preamble signal in a frequency band having a width of 20 MHz.

In the 5.9 GHz frequency band, a channel configuration scheme may differ from country to country. The channels shown in FIG. 8 may be channels configured according to US regulations. Control channels (CCHs) and service channels (SCHs) may be configured in the 5.9 GHz frequency band. The CCH may be mainly used for transmission of control information. The SCH may be used for transmission of general information (e.g., user data) according to contents negotiated through the CCH. The size of the frequency band of the CCH may be 10 MHz. The size of the frequency band of the SCH may be 10 MHz or 20 MHz. Two channels having a frequency bandwidth of 10 MHz may be used as one SCH.

Figure 9:
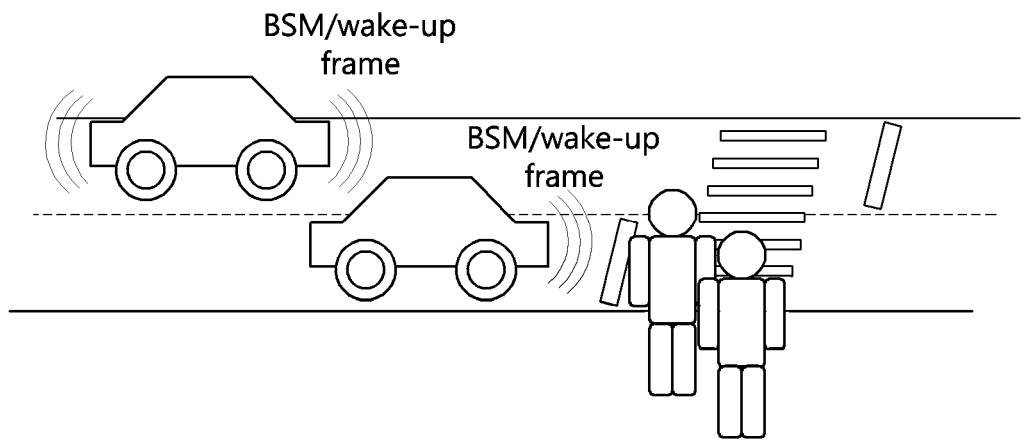
FIG. 9 is a conceptual diagram illustrating a first embodiment of a method for transmitting and receiving vehicle information in a wireless LAN system.

FIG. 9 is a conceptual diagram illustrating a first embodiment of a method for transmitting and receiving vehicle information in a wireless LAN system.

As shown in FIG. 9, ITS communication may be performed between stations without an AP. For example, a terminal (e.g., station, communication node, or communication terminal) located in a vehicle may transmit a basic safety message (BSM) for informing that the vehicle approaches a crosswalk. The BSM may be transmitted in a broadcast scheme. Also, the BSM may be transmitted periodically. For example, the BSM may be transmitted every 100 milliseconds (ms). The BSM may include an identifier (e.g., ID), location information, speed information, and the like of the vehicle. A terminal (e.g., station, communication node, or communication terminal) carried by a pedestrian may determine that the vehicle is approaching by receiving the BSM. The terminal located in the vehicle may be referred to as a 'vehicle terminal', and the terminal carried by the pedestrian may be referred to as a 'pedestrian terminal'.

When the BSM is transmitted in the OCB communication scheme, the vehicle terminal may be in a state not associated with the AP. In this case, when a channel to be used is not negotiated between the vehicle terminal and a receiving terminal (e.g., pedestrian terminal), the vehicle terminal may perform communications after negotiating the channel to be used with the receiving terminal through the CCH. Alternatively, the vehicle terminal may transmit a message (e.g., ITS communication message or vehicle communication message) using the CCH. The delay of the communication procedure using the CCH without negotiation of the channel to be used may be shorter than the delay of the communication procedure using the negotiated channel to be used. However, when a large number of messages are transmitted on the CCH, the requirement(s) of delay and/or transmission success probability may not be satisfied due to excessive channel occupation. In embodiments, the message may refer to a frame or a signal.

When the pedestrian terminal is an LP STA, in order to support this, an ITS terminal (e.g., a terminal supporting ITS) may support a function for waking up the LP STA. For example, the ITS terminal may transmit a wake-up frame (e.g., WUR wake-up frame).

Figure 10:
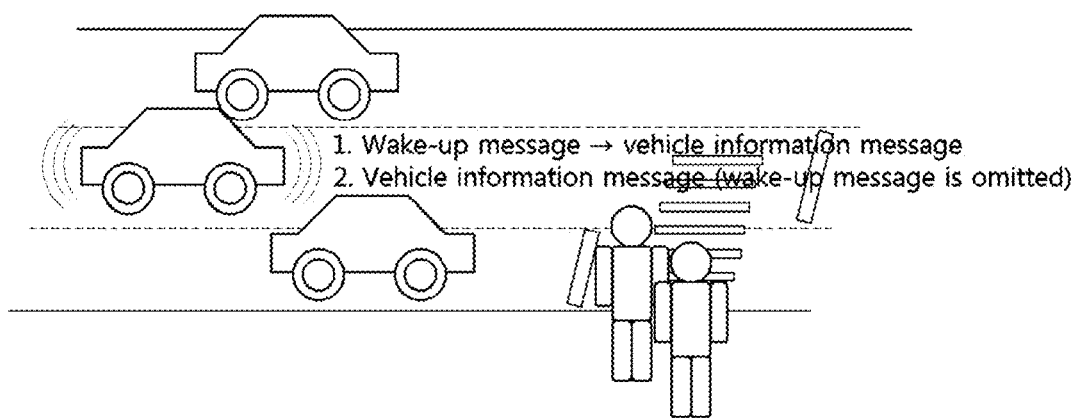
FIG. 10 is a conceptual diagram illustrating a second embodiment of a method for transmitting and receiving vehicle information in a wireless LAN system.

FIG. 10 is a conceptual diagram illustrating a second embodiment of a method for transmitting and receiving vehicle information in a wireless LAN system.

As shown in FIG. 10, the vehicle terminal may wake up the receiving terminal (e.g., another vehicle terminal, pedestrian terminal) by transmitting a wake-up frame (e.g., WUR wake-up frame) and then may transmit a message (e.g., BSM) including vehicle information (e.g., vehicle approach information). However, when a wake-up frame is transmitted in a broadcast scheme by another vehicle terminal before the vehicle terminal transmits the wake-up frame, the vehicle terminal may estimate that the receiving terminal operates in the wake-up state. Accordingly, the vehicle terminal may transmit the message including the vehicle information without transmitting its own wake-up frame.

The vehicle terminal recognizing that a wake-up frame has been transmitted by another vehicle terminal may estimate an effective range (e.g., transmission range, transmission distance, etc.) of the wake-up frame. The estimation is performed by identifying a reception strength of the wake-up frame and/or BSM of another vehicle having transmitted the wake-up frame to determine whether the wake-up frame wakes up the receiving terminal. In order to estimate the effective range (e.g., transmission range, transmission distance, etc.) based on the reception strength of the wake-up frame, the vehicle terminal may need to know a transmission power used by another vehicle terminal for transmission of the corresponding wake-up frame.

An information element indicating the transmission power may be included in the wake-up frame. Alternatively, the transmission power may be determined in a negotiation procedure (e.g., initial negotiation procedure). Alternatively, a preset fixed value may be used as the transmission power. When it is determined that the wake-up frame wakes up the receiving terminal based on the estimated effective range, the vehicle terminal may omit transmission of its own wake-up frame.

On the other hand, when a wake-up frame is not transmitted by another vehicle during a preset period or when it is determined that the wake-up frame cannot wake up the receiving terminal based on the estimated effective range, the vehicle terminal may transmit its own wake-up frame to wake up the receiving terminal.

The vehicle terminal supporting the vehicle wireless LAN standard may perform the above-described operation, and the wake-up frame and/or the message including the vehicle information may be transmitted on the CCH. The vehicle terminal may perform a wake-up frame transmission operation through cooperation with other vehicle terminal(s) (e.g., neighboring vehicle terminal). In this case, even if the number of vehicle terminals increases, it may be prevented that wake-up frames excessively occupy the channel. In addition, it may be prevented that the transmission success probability is reduced.

Figure 11:
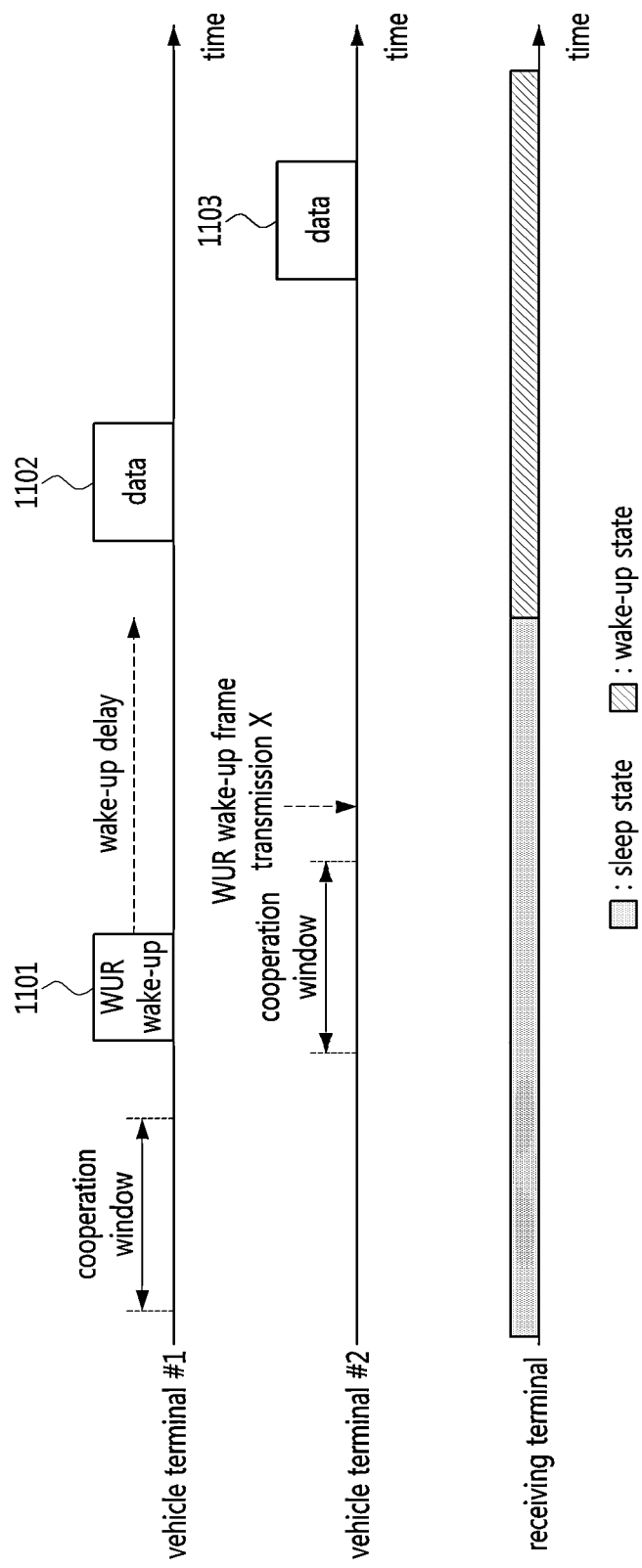
FIG. 11 is a timing diagram illustrating a first embodiment of a method for transmitting and receiving vehicle information in a wireless LAN system.

FIG. 11 is a timing diagram illustrating a first embodiment of a method for transmitting and receiving vehicle information in a wireless LAN system.

As shown in FIG. 11, a wireless LAN system may include a vehicle terminal #1, a vehicle terminal #2, and a receiving terminal. Each of the vehicle terminal #1, the vehicle terminal #2, and the receiving terminal may be the station shown in FIG. 2, FIG. 3, or FIG. 4. The receiving terminal may be a pedestrian terminal. When a data frame (e.g., packet) to be transmitted from the vehicle terminal #1 to the receiving terminal occurs, the vehicle terminal #1 may perform monitoring during a cooperative (or, cooperation) window to identify whether a valid wake-up frame has been transmitted by another terminal.

The cooperative window may be preconfigured through negotiation between communication terminals belonging to the wireless LAN system. Alternatively, the cooperative window may be defined by a preset fixed value(s). Alternatively, the AP may configure the cooperative window and may transmit a message including an information element indicating the cooperative window. The cooperative window may start from a time at which a data frame to be transmitted to the receiving terminal occurs. The valid wake-up frame may be a wake-up frame capable of waking up the receiving terminal.

When the valid wake-up frame is not received within the cooperative window, the vehicle terminal #1 may transmit a wake-up frame (e.g., WUR wake-up frame) 1101 to the receiving terminal in order to wake up the receiving terminal. The wake-up frame 1101 may be transmitted when a channel is determined to be in an idle state by a carrier sensing operation. The receiving terminal may receive the wake-up frame 1101 from the vehicle terminal #1 and thus may operate in the wake-up state. For example, the operation state of the PCR included in the receiving terminal may transition from the sleep state to the wake-up state when the wake-up frame 1101 is received.

After transmitting the wake-up frame 1101, the vehicle terminal #1 may transmit a data frame 1102 to the receiving terminal. The data frame 1102 may be a frame including vehicle information. The data frame 1102 may be a BSM. The data frame 1102 may be transmitted when a channel is determined to be in an idle state by a carrier sensing operation. The receiving terminal (e.g., PCR of the receiving terminal) may receive the data frame 1102 from the vehicle terminal #1. When the data frame 1102 is successfully received, the receiving terminal may transmit an ACK frame for the data frame 1102 to the vehicle terminal #1.

On the other hand, when a data frame (e.g., packet) to be transmitted to the receiving terminal occurs in the vehicle terminal #2, the vehicle terminal #2 may perform monitoring during the cooperative window to identify whether a valid wake-up frame has been transmitted by another terminal. When a distance between the vehicle terminal #2 and the vehicle terminal #1 is shorter than a preset distance (e.g., when a position of the vehicle terminal #2 is close to a position of the vehicle terminal #1), the vehicle terminal #2 may receive the wake-up frame 1101 transmitted by the vehicle terminal #1 within the cooperative window.

When the wake-up frame 1101 is a non-valid wake-up frame and when a valid wake-up frame is not received within the cooperative window, the vehicle terminal #2 may transmit a wake-up frame to wake up the receiving terminal. The vehicle terminal #2 may transmit a data frame 1103 to the receiving terminal after a wake-up delay time elapses. The data frame 1103 may be transmitted when a channel is determined to be in an idle state by a carrier sensing operation. The data frame 1103 may be a frame (e.g., BSM) including vehicle information.

On the other hand, when the wake-up frame 1101 is a valid wake-up frame, the vehicle terminal #2 may not transmit a wake-up frame for waking up the receiving terminal. In other words, the vehicle terminal #2 may transmit the data frame 1103 to the receiving terminal without transmitting a wake-up frame. The data frame 1103 may be transmitted after the receiving terminal wakes up. The data frame 1103 may be transmitted when a channel is determined to be in an idle state by a carrier sensing operation. In order to prevent a collision between the data frame 1102 and the data frame 1103, the vehicle terminal #2 may transmit the data frame 1103 to the receiving terminal after the data frame 1102 is transmitted.

A plurality of vehicle terminals (e.g., vehicle terminal #2 and vehicle terminal #3) that have detected a valid wake-up frame may exist, and the plurality of vehicle terminals may transmit data frames without transmitting a wake-up frame. In this case, collisions between the data frames may occur. In order to solve this problem, when transmission of a wake-up frame is omitted, EDCA parameter(s) having a large contention window may be used for transmission of the data frame. For example, the vehicle terminal #2 may perform a carrier sensing operation using the EDCA parameter(s) having a large contention window after a wake-up delay elapses, and when a channel is determined to be in an idle state by a carrier sensing operation, the vehicle terminal #2 may transmit the data frame 1103.

The aforementioned windows (e.g., cooperative window and/or contention window) may be dynamically configured according to a speed of the vehicle. When the speed of the vehicle is equal to or greater than a threshold value (e.g., when the speed of the vehicle is high), the vehicle terminal may use a small cooperative window to detect a valid wake-up frame. When the speed of the vehicle is less than the threshold value (e.g., when the speed of the vehicle is low), the vehicle terminal may use a large cooperative window to detect a valid wake-up frame. The cooperative window may be configured by a network. In this case, a roadside unit (RSU) may transmit a message including an information element indicating the cooperative window to the vehicle terminal(s).

In another embodiment, the cooperative window may be dynamically configured according to a channel congestion level (e.g., a channel occupancy state, amount of traffic, number of communication terminals performing communications). The channel congestion level may be determined based on signal(s) received on the channel. When the channel congestion level is equal to or greater than a threshold (e.g., when the number of communication terminals is large), the vehicle terminal may use a large cooperative window to detect a valid wake-up frame. On the other hand, when the channel congestion level is less than the threshold (e.g., when the number of communication terminals is small), the vehicle terminal may use a small cooperative window to detect a valid wake-up frame.

Meanwhile, the receiving terminal (e.g., pedestrian terminal) may operate in the wake-up state when receiving the wake-up frame and may receive the data frames 1102 and 1103 from the vehicle terminal(s). When the data frames 1102 and 1103 are received, the receiving terminal may operate in the low-power state after a window preconfigured to identify presence of the vehicle terminal.

Figure 12:
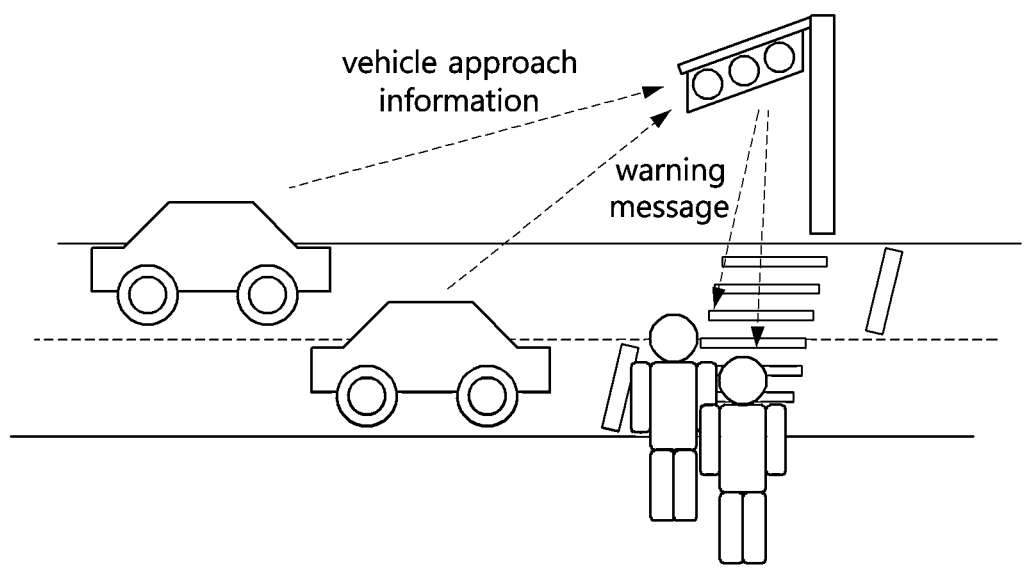
FIG. 12 is a conceptual diagram illustrating a third embodiment of a method for transmitting and receiving vehicle information in a wireless LAN system.

FIG. 12 is a conceptual diagram illustrating a third embodiment of a method for transmitting and receiving vehicle information in a wireless LAN system.

As shown in FIG. 12, a vehicle terminal may transmit a message (e.g., BSM) including vehicle information (e.g., vehicle approach information), and an RSU may relay the message. For example, the RSU may transmit the message received from the vehicle terminal to another vehicle terminal and/or pedestrian terminal. In this case, the RSU may transmit, to another vehicle terminal and/or pedestrian terminal, a warning message indicating that the vehicle approaches. The message received from the vehicle terminal may include an identifier, location information, speed information, and the like of the vehicle. The RSU may change a signal of a traffic light based on the information included in the message received from the vehicle terminal and may transmit a warning message indicating that the vehicle approaches to the pedestrian terminal.

In the above-described communication method, the RSU may perform functions of an AP, and vehicle communications may be implemented by communications between the AP and the station (e.g., vehicle terminal or pedestrian terminal). In this case, an authentication procedure and an association procedure between the AP and the station may be performed, and negotiation of a channel to be used may be performed in the authentication procedure and/or the association procedure.

Meanwhile, in ITS communication, the pedestrian terminal may be an LP STA. In this case, the pedestrian terminal may perform a low-power operation and may support a short delay time. The pedestrian terminal may operate in the low-power state (e.g., sleep state). When the wake-up frame (e.g., WUR wake-up frame) is received, the operation state of the pedestrian terminal may transition from the low-power state to a normal state (e.g., wake-up state). The pedestrian terminal operating in the normal state may receive a frame (e.g., data frame, BSM) from another communication terminal (e.g., vehicle terminal, RSU).

The wake-up frame for ITS communication may be the same as or similar to the wake-up frame 700 shown in FIG. 7. For example, the wake-up frame for ITS communication may include a legacy preamble and a WUR payload. The legacy preamble may include the L-STF, L-LTF, and L-SIG field, and may be transmitted in a frequency band having a 10 MHz bandwidth. Also, the legacy preamble may further include a BPSK-mark. The WUR payload may include a wake-up preamble, a MAC header, a frame body, and an FCS field and may be transmitted in a frequency band having a 4 MHz bandwidth.

In the communication environment shown in FIG. 9, the vehicle terminal may transmit a wake-up frame, and in the communication environment shown in FIG. 12, the RSU may transmit a wake-up frame. The receiving terminal of the wake-up frame may be a pedestrian terminal. In order to transmit a data frame or BSM to the pedestrian terminal, the vehicle terminal or RSU may transmit the wake-up frame to wake up the pedestrian terminal and perform communications by transmitting the data frame or BSM after the wake-up delay time of the pedestrian terminal. The wake-up delay time may be a time required for the operation state of the pedestrian terminal (e.g., PCR) to transition from the sleep state to the wake-up state. The channel through which the wake-up frame is transmitted may be the same as the channel through which the data frame or BSM is transmitted.

When the wake-up frame is transmitted in the 5.9 GHz frequency band, the legacy preamble of the wake-up frame may be configured to be decodable by a communication terminal using the 5.9 GHz frequency band (e.g., communication terminal supporting the vehicle wireless LAN standards (e.g., IEEE 802.11p and/or IEEE 802.11d). The legacy preamble of the wake-up frame transmitted in the 5.9 GHz frequency band (e.g., legacy preamble including an information element indicating the length of the wake-up frame) may be configured identically to a signal according to IEEE 802.11p. For example, a transmission bandwidth of the legacy preamble of the wake-up frame may be 10 MHz, and the legacy preamble may have a form in which a symbol length is doubled. The symbol length of the legacy preamble of the wake-up frame transmitted in the 5.9 GHz frequency band may be twice the symbol length of the legacy preamble of the wake-up frame 700 shown in FIG. 7. The wake-up frame transmitted in the 5.9 GHz frequency band may be configured identically or similarly to the wake-up frame 700 shown in FIG. 7.

When the above-described wake-up frame is transmitted, a communication terminal using the same frequency band may accurately recognize the length of the wake-up frame. Therefore, according to the wake-up frames transmitted in the narrow band, a collision problem between frames may not occur. The vehicle terminal may support OCB communication. In this case, the vehicle terminal may transmit the wake-up frame on the CCH without performing a channel negotiation procedure for transmission of the wake-up frame with the receiving terminal (e.g., pedestrian terminal). Accordingly, an emergency message may be transmitted without a delay due to execution of the channel negotiation procedure for transmission of a wake-up frame.

Figure 13:
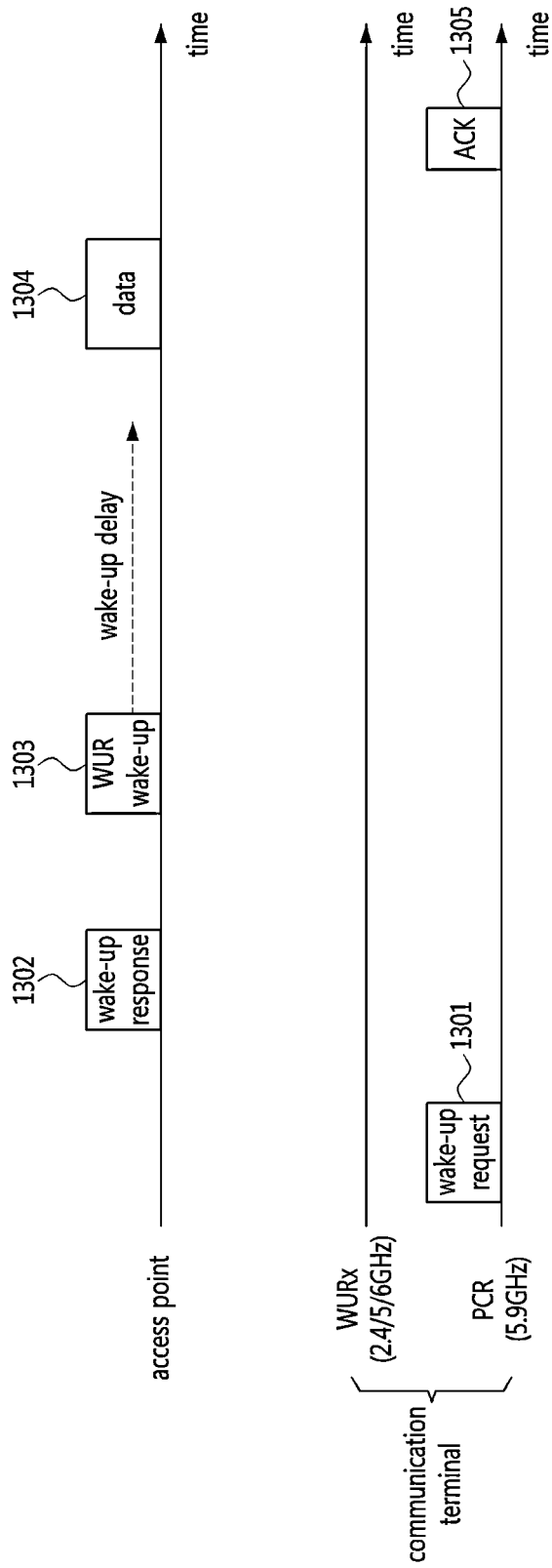
FIG. 13 is a timing diagram illustrating a first embodiment of a method for transmitting and receiving a wake-up frame in a wireless LAN system.

FIG. 13 is a timing diagram illustrating a first embodiment of a method for transmitting and receiving a wake-up frame in a wireless LAN system.

As shown in FIG. 13, a wake-up frame may be transmitted in the 2.4 GHz frequency band, 5 GHz frequency band, or 6 GHz frequency band. A normal frame (e.g., data frame, BSM) may be transmitted in the 5.9 GHz frequency band. The wake-up frame may be transmitted using a channel for ITS communication (hereinafter, referred to as 'ITS communication channel'). When a wake-up frame having a long transmission time is transmitted in the ITS communication channel, an occupancy of the ITS communication channel may increase. In particular, when a vehicle terminal uses a CCH without performing a separate channel negotiation procedure, the occupancy of the CCH may increase by the wake-up frame and signals (e.g., periodic signals) transmitted by the vehicle terminal. Accordingly, a probability of occurrence of a collision may increase.

In order to solve the problem that the 5.9 GHz frequency band (e.g., CCH) is excessively occupied due to the wake-up frames, the channel for transmitting the wake-up frame may be separated from the existing vehicle communication channel. For example, the channel for transmitting the wake-up frame may be configured as a channel in the 2.4 GHz frequency band, 5 GHz frequency band, or 6 GHz frequency band. When the channel for transmitting the wake-up frame is configured differently from the existing vehicle communication channel, the transmitting terminal (e.g., WURx, WUTx, or WUR included in the transmitting terminal) and the receiving terminal (e.g., WURx included in the receiving terminal) may support the above-described channel (e.g., channel for transmitting the wake-up frame). Here, the transmitting terminal may be a communication terminal transmitting the wake-up frame, and the receiving terminal may be a communication terminal receiving the wake-up frame.

The transmission channel (e.g., transmission band) of the wake-up frame may be preconfigured by a negotiation procedure between the transmitting terminal and the receiving terminal. Since the negotiation procedure cannot be performed every time the wake-up frame is transmitted, communications between the AP and the communication terminal (e.g., transmitting terminal and receiving terminal) may be a premise. As in the communication environment shown in FIG. 12, when a vehicle terminal transmits a signal to an RSU and when the RSU transmits a wake-up frame to wake up a communication terminal (e.g., pedestrian terminal) and then transmits a warning message, the operation described above may be used.

The negotiation procedure of the transmission channel of the wake-up frame may be performed in an authentication procedure and/or an association procedure between the AP and the communication terminal (e.g., station). The negotiation procedure of the transmission channel of the wake-up frame may be performed in the negotiation procedure for the communication operation using the WUR. For example, when the communication operation using the WUR is to be performed, the communication terminal may transmit a wake-up request frame 1301 including an information element indicating one or more channels (e.g., one or more frequency bands) supportable by the WUR. The wake-up request frame 1301 may be transmitted by the PCR of the communication terminal. The wake-up request frame 1301 may be transmitted in the 5.9 GHz frequency band.

The AP may receive the wake-up request frame 1301 from the communication terminal and may identify the information element(s) included in the wake-up request frame 1301. The AP may determine a channel (e.g., band) to be used for transmission of a wake-up frame 1303 and may transmit a wake-up response frame 1302 including an information element indicating the channel to be used for transmission of the wake-up frame 1303 to the communication terminal. The channel indicated by the wake-up response frame 1302 may be one of the channel(s) indicated by the wake-up request frame 1301. The communication terminal may receive the wake-up response frame 1302 from the AP and may determine that the channel (e.g., band) indicated by the wake-up response frame 1302 is to be used for transmission of the wake-up frame 1303.

Meanwhile, in the vehicle wireless charging scenario, the above-described operations (e.g., the embodiment shown in FIG. 13) may be used. In this case, in the channel negotiation procedure, an SoC level may be determined. The SoC level is a reference by which the vehicle operates in the sleep state or wake-up state. The communication terminal is located in the vehicle. The PCR included in the communication terminal may be woken up based on the SoC level. When the wake-up frame 1303 is received and a battery charge level of the vehicle in which the communication terminal is located is equal to or less than the SoC level, the operation state of the PCR included in the communication terminal may transition from the sleep state to the wake-up state. In this case, the operation state of the vehicle in which the communication terminal is located may transition from the deep sleep state to the sleep state or wake-up state.

In the SoC level negotiation procedure, the communication terminal may transmit the wake-up request frame 1301 including information on a desired SoC level (e.g., candidate SoC level). The wireless charging system in which the AP is located may determine a final SoC level in consideration of the candidate SoC level, and the AP may transmit the wake-up response frame 1302 including information on the final SoC level. In other words, the final SoC level may be determined through the exchange of the wake-up request frame 1301 and the wake-up response frame 1302.

Alternatively, in the SoC level negotiation procedure, the wake-up request frame 1301 may not include the information of the candidate SoC level. In this case, the wake-up response frame 1302 may include information of an SoC level determined by the wireless charging system. The SoC level (e.g., candidate SoC level, final SoC level) may be indicated by reserved bit(s) in an WUR mode element. A general wireless LAN frame may be used in the SoC level negotiation procedure. In this case, the PCR may transmit a general MAC frame for the SoC level negotiation. Here, the Ethertype of the general MAC frame may be defined as a 'wireless charging type'. The Ethertype defined as the wireless charging type may indicate that a transmission target and a reception target of the corresponding general MAC frame support the wireless charging application.

When the channel for transmission of the wake-up frame is negotiated, the AP (e.g., AP located in the RSU) may transmit the wake-up frame 1303 to the communication terminal using the negotiated channel. The wake-up frame 1303 may be a WUR wake-up frame. The wake-up frame 1303 may be transmitted through the 2.4 GHz frequency band channel, 5 GHz frequency band channel, or 6 GHz frequency band channel. When it is determined that the communication terminal has woken up, the AP may perform ITS communication by transmitting a data frame 1304 using the existing channel (e.g., 5.9 GHz frequency band channel).

The WUR (e.g., WURx) of the communication terminal may receive the wake-up frame 1303 from the AP by performing a monitoring operation on the negotiated channel. In this case, the operation state of the PCR included in the communication terminal may transition from the sleep state to the wake-up state. The PCR of the communication terminal may receive the data frame 1304 from the AP by performing a monitoring operation on the existing channel (e.g., 5.9 GHz frequency band channel). When the data frame 1304 is successfully received, the communication terminal may transmit an ACK 1305 frame for the data frame 1304 to the AP. When the ACK frame 1305 is received from the communication terminal, the AP may determine that the data frame 1304 has been successfully received at the communication terminal.

When the transmission channel of the wake-up frame is configured differently from the ITS communication channel, the ITS communication channel may not be occupied by the wake-up frame. A problem caused when the transmission bandwidth of the wake-up frame is different from the channel bandwidth of the 5.9 GHz frequency band may not occur. The communication terminal supporting the above-described operation may determine a reception channel (e.g., 2.4 GHz frequency band channel, 5 GHz frequency band channel, or 6 GHz frequency band channel) of the wake-up frame by performing a negotiation procedure for WUR operation (e.g., low-power operation) with the AP, and after determining the reception channel of the wake-up frame, it may operate in the WUR mode (e.g., low-power mode). When the wake-up frame is received in the negotiated channel, the communication terminal may switch the operation channel from the negotiated channel to the ITS communication channel (e.g., 5.9 GHz frequency band channel).

The wake-up frame may include an indicator indicating that it is a wake-up frame for ITS communication and/or information of the ITS communication channel. The indicator and the information of the ITS communication channel may be indicated by a type field included in a MAC header of the wake-up frame. Alternatively, the indicator and the information of the ITS communication channel may be indicated by a separate ID or type-dependent control field. The bandwidth of the ITS communication channel (e.g., channel for transmitting and receiving ITS frames) may be 10 MHz or 20 MHz. The bandwidth of the transmission channel of the wake-up frame may be 20 MHz. The transmission channel of the wake-up frame may be preconfigured. In this case, the negotiation procedure for the transmission channel of the wake-up frame may not be performed. Accordingly, the operation channel of the AP and/or the communication terminal may be directly switched to the transmission channel of the wake-up frame. The ITS communication channel may be preconfigured. Alternatively, the ITS communication channel may be indicated by an information element included in the wake-up frame.

In the communication environment shown in FIG. 12, the RSU (e.g., traffic light) may receive an ITS frame from the vehicle terminal in the ITS communication channel (e.g., 5.9 GHz frequency band channel). The RSU may transmit a wake-up frame to a pedestrian terminal in consideration of a distance to the vehicle, the speed of the vehicle, and/or a wake-up delay time of the pedestrian terminal. The communication range of the vehicle terminal may be 1 km. In order to prevent a large number of communication terminals from waking up, the RSU may adjust a transmission power of the wake-up frame.

The wake-up frame may be received on a channel of an unlicensed band, and the ITS frame may be received on a primary channel (e.g., 5.9 GHz frequency band channel). In this case, if OCB communication is supported, a negotiation procedure for the wake-up operation cannot be performed in the 5.9 GHz frequency band. Accordingly, the negotiation procedure for the wake-up operation may be omitted. Parameter(s) for the wake-up operation may be preconfigured. Alternatively, the parameter(s) may be configured based on information transmitted through ITS frame(s) according to the vehicle wireless LAN standard (e.g., IEEE 802.11p or IEEE 802.11d).

A wake-up beacon frame may be periodically transmitted in the channel of the unlicensed band (e.g., 2.4 GHz frequency band, 5 GHz frequency band, or 6 GHz frequency band) in which the wake-up frame is transmitted. In this case, the communication terminal may identify the channel on which the wake-up operation is to be performed by receiving the wake-up beacon frame in the channel of the unlicensed band. Thereafter, the communication terminal may perform a monitoring operation on the identified channel to receive the wake-up frame. When the wake-up frame is received, the operation state of the PCR included in the communication terminal may be transitioned from the sleep state to the wake-up state. A receiver address of the wake-up frame may be a specific multicast address indicating all communication terminals for which the ITS communication channel is configured as a primary channel thereof. Since the receiver address of the wake-up frame is set to the specific multicast address, the above-described operation of the communication terminal may be supported.

FIG. 14 is a block diagram illustrating a second embodiment of a WUR wake-up frame in a wireless LAN system.

As shown in FIG. 14, a WUR wake-up frame 1400 may include a legacy preamble and a WUR payload 1450. The legacy preamble may include an L-STF 1410, L-LTF 1420, and L-SIG field 1430. Also, the legacy preamble may further include a BPSK-mark 1440. The WUR payload 1450 may include a wake-up preamble 1451, MAC header 1452, ITS information field 1453, other information field 1454, and FCS field 1455.

In ITS communication using a wake-up frame, a delay time according to transmission of the wake-up frame and/or a delay time according to a state transition time of a communication terminal may occur. In order to reduce the delay time, an ITS information field may be added to the wake-up frame (e.g., WUR wake-up frame 1400). The pedestrian terminal may receive the wake-up frame and thus may operate in the wake-up state. The pedestrian terminal operating in the wake-up state may identify the ITS information included in the wake-up frame and may transmit/receive the ITS frame based on the ITS information without receiving other information. The ITS information field included in the wake-up frame may include a warning field indicating that the vehicle is approaching, a signal field indicating a current signal (e.g., red, yellow, green) of a traffic light, and/or a stop field indicating that the pedestrian terminal should stop due to an occurrence of an emergency situation.

By adding ITS information bit(s) having a size of 1 to 2 bits to the wake-up frame, a delay time for receiving the emergency message in the communication terminal (e.g., pedestrian terminal) may be reduced. In this case, a risk due to the delay time of vehicle communication may be reduced.

Meanwhile, in the vehicle wireless charging scenario, the ITS information included in the wake-up frame (e.g., WUR wake-up frame) may include SoC information (e.g., SoC level, SoC value, SoC threshold). The operation state of the vehicle may be determined based on the SoC level. When the wake-up frame is received and a battery charge level of the vehicle exceeds the SoC level indicated by the wake-up frame, the vehicle may remain in the deep sleep state. When the wake-up frame is received and the battery charge state of the vehicle is below the SoC level indicated by the wake-up frame, the operation state of the vehicle may transition from the deep sleep state to the sleep state or wake-up state. In this case, the PCR included in the communication terminal (e.g., LP STA) located in the vehicle may operate in the wake-up state. The PCR may transmit a PS-Poll frame or a QoS null frame indicating that it operates in the wake-up state. The PS-Poll frame or the QoS null frame may include current SoC information (e.g., current battery charge state information) of the vehicle. The PCR operating in the wake-up state may transmit and receive information for wireless charging.

The operation state of the PCR included in the communication terminal that has received the wake-up frame including the ITS information field may transition from the sleep state to the wake-up state, and the PCR operating in the wake-up state may receive the ITS frame. The ITS terminal may include a receiver for receiving the ITS frame. The ITS terminal may transition to the normal state (e.g., wake-up state) more quickly than other communication terminals. The ITS information may include information (e.g., frequency information) on the channel through which the ITS frame is received. The communication terminal (e.g., PCR and/or WURx included in the communication terminal) may switch the operation channel to the channel indicated by the ITS information and may perform a monitoring operation on the switched channel. The wake-up frame including the ITS information transmitted in the 5.9 GHz frequency band may be configured identically or similarly to the wake-up frame including the legacy preamble having a 10 MHz bandwidth (e.g., WUR wake-up frame 700 shown in FIG. 7). The wake-up frame including the ITS information transmitted in an unlicensed band may be configured identically or similarly to the wake-up frame (e.g., WUR wake-up frame 700 shown in FIG. 7) including the legacy preamble having a 20 MHz bandwidth.

Figure 15:
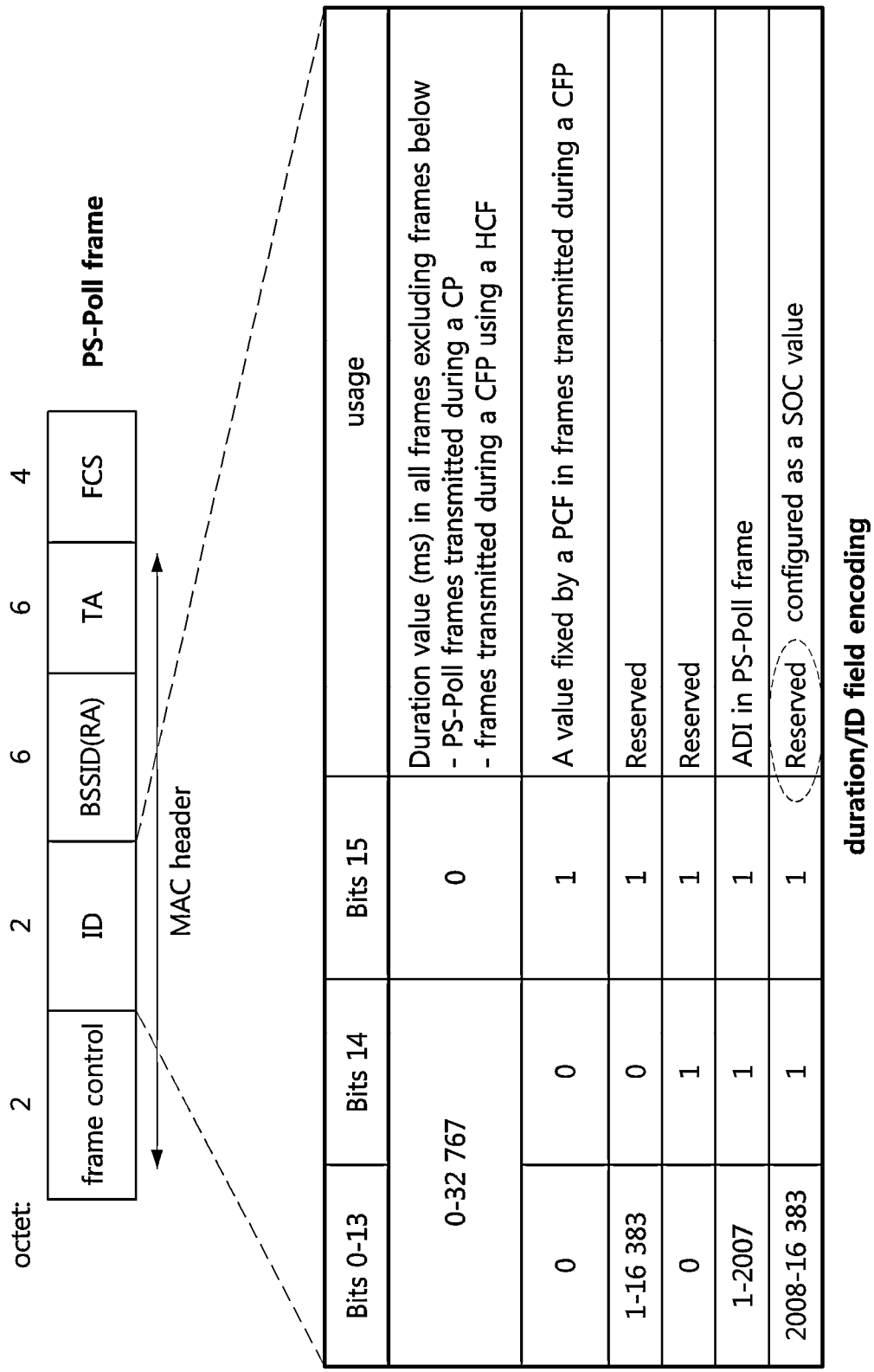
FIG. 15 is a block diagram illustrating a first embodiment of a WUR-Poll frame.

FIG. 15 is a block diagram illustrating a first embodiment of a WUR-Pol frame.

As shown in FIG. 15, the communication terminal receiving the WUR wake-up frame may transmit a WUR-poll frame indicating that the PCR of the corresponding communication terminal operates in the wake-up state after a wake-up delay time elapses. In addition, the WUR-poll frame may indicate that the vehicle in which the communication terminal is located operates in the sleep state or wake-up state. Here, the WUR-Poll frame may be a PS-Poll frame.

The PS-Poll frame may include an ID field. The ID field may indicate an AID assigned by the AP. However, the AID may not be used in the vehicle wireless charging scenario. In this case, values (e.g., 2008 to 16383) indicated by bits not used for the AID may be used to indicate the SoC level. If the ID field indicates another value instead of the AID, the another value may be assumed to be the SoC level, and the SoC level may be used in the vehicle wireless charging scenario.

Figure 16:
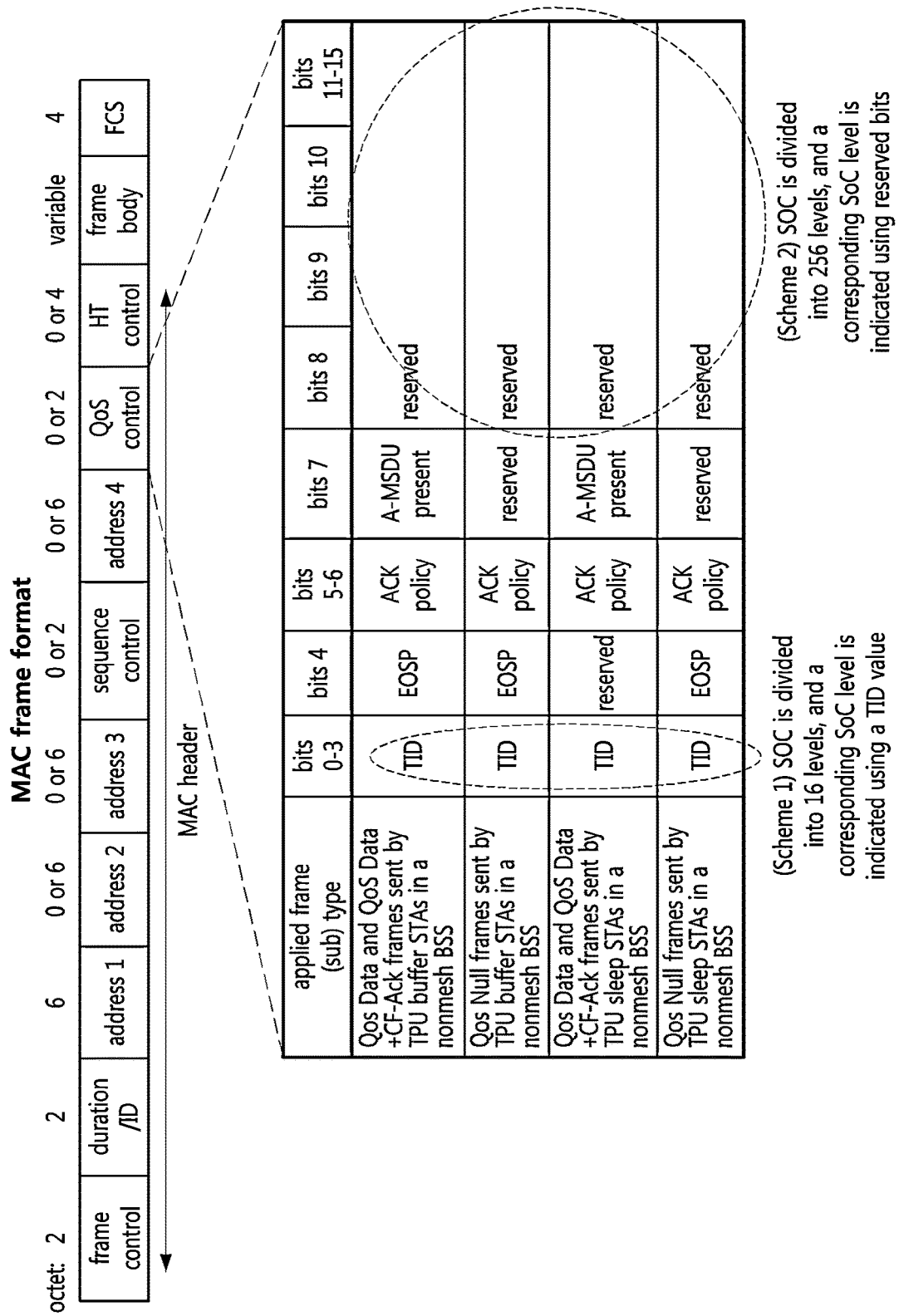
FIG. 16 is a block diagram illustrating a second embodiment of a WUR-Poll frame.

FIG. 16 is a block diagram illustrating a second embodiment of a WUR-Pol frame.

As shown in FIG. 16, the communication terminal receiving the WUR wake-up frame may transmit a WUR-poll frame indicating that the PCR of the corresponding communication terminal operates in the wake-up state after a wake-up delay time elapses. In addition, the WUR-poll frame may indicate that the vehicle in which the communication terminal is located operates in the sleep state or wake-up state. Here, the WUR-poll frame may be a QoS null frame. The QoS null frame may include a QoS control field, and the QoS control field may indicate a TID.

In the vehicle wireless charging scenarios, the TID may not be used. In this case, bits allocated for the TID (e.g., bits 0 to 3) may be used to indicate the SoC level. Alternatively, reserved bits (e.g., bits 8-15) included in a QoS control field may be used to indicate the SoC level. When the SoC level cannot be indicated by the QoS null frame, a payload including bits indicating the SoC level may be generated, and a frame (e.g., WUR-poll frame) including the corresponding payload may be transmitted. The corresponding frame may be a QoS frame. An element of a MAC header included in the QoS frame may include an indicator indicating that the payload includes the SoC level.

Figure 17:
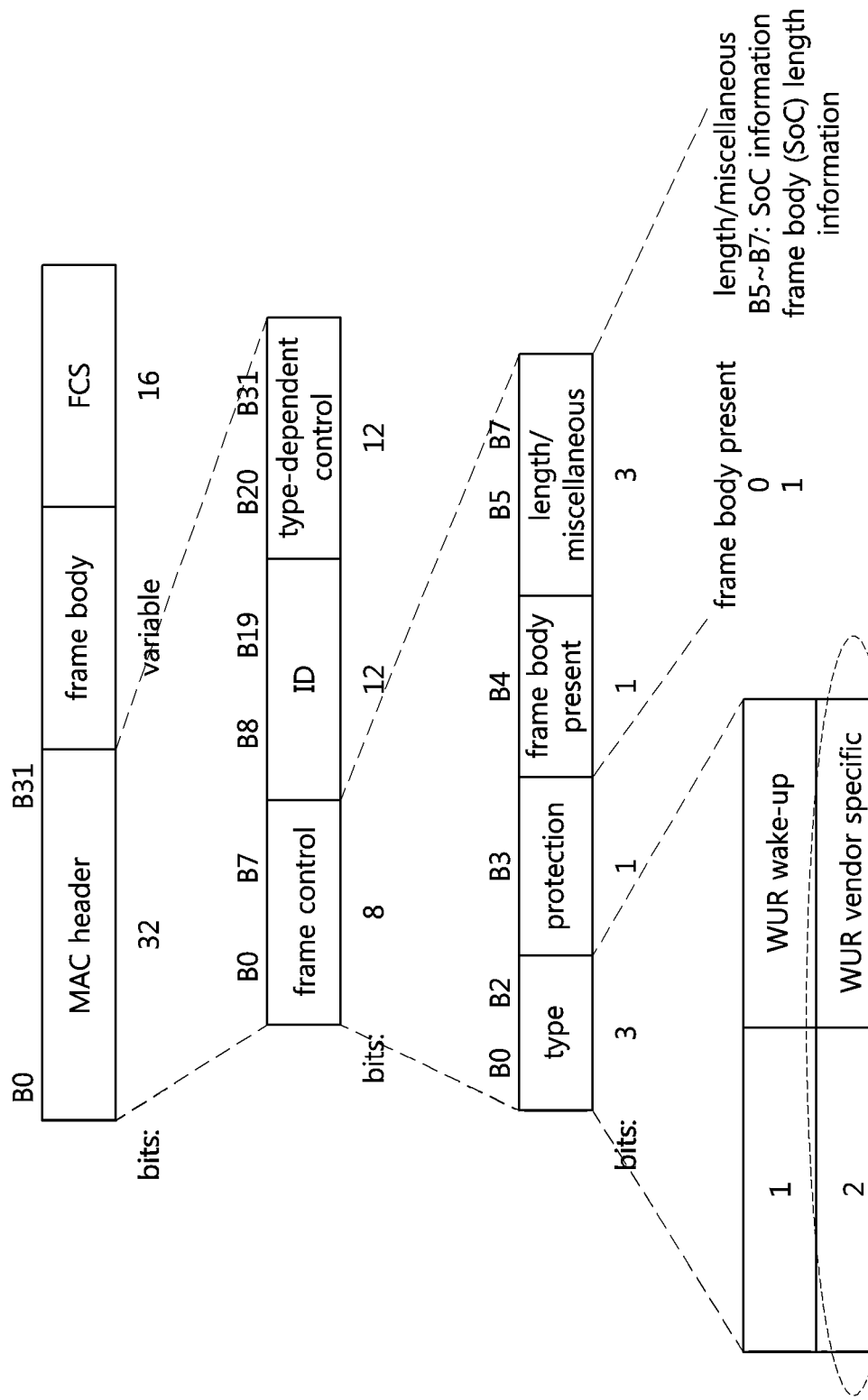
FIG. 17 is a block diagram illustrating a first embodiment of a WUR vendor-specific frame in a wireless LAN system.

FIG. 17 is a block diagram illustrating a first embodiment of a WUR vendor-specific frame in a wireless LAN system.

As shown in FIG. 17, in the above-described embodiments, a WUR vendor-specific frame may be used instead of the WUR wake-up frame. The operation when the WUR vendor-specific frame is used may be the same as the operation when the WUR wake-up frame is used. A frame body of the WUR vendor-specific frame may include SoC information (e.g., charging-related information). Alternatively, a frame control field included in a MAC header of the WUR vendor-specific frame may include the SoC information (e.g., charging-related information).

In order for the frame body of the WUR vendor-specific frame to include the SoC information, a frame body present bit of the frame control field may be set to 1, and length information of the frame body may be included. In order for the frame control field of the WUR vendor-specific frame to include the SoC information, the frame body present bit may be set to 0, and the SoC information may be delivered by using bits 5-7 corresponding to a length/miscellaneous field. The frame body present bit set to 0 may indicate that the frame body does not exist. The SoC information may be the SoC level.

The embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who have ordinary skill in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above hardware device can be configured to operate as at least one software module in order to perform the embodiments of the present disclosure, and vice versa.

While the embodiments of the present disclosure and their advantages have been described in detail, it should be understood that various changes, substitutions, and alterations may be made herein without departing from the scope of the present disclosure.

The invention claimed is:

1. A first communication node in a wireless local area network (LAN) system, the first communication node comprising:
    a processor;
    a memory storing one or more instructions executable by the processor;
    a first transceiver operating based on the one or more instructions; and
    a second transceiver operating based on the one or more instructions,
    wherein the one or more instructions are executed to:
        transmit, to a second communication node, a request frame by using the first transceiver, the request frame including an information element indicating one or more channels supported by the second transceiver; and
        receive, from the second communication node by using the first transceiver, a response frame including an information element indicating a first channel on which a wake-up frame is transmitted,
        wherein the first channel indicated by the response frame is one of the one or more channels supported by the second transceiver,
    wherein an operation bandwidth of the first transceiver is wider than an operation bandwidth of the second transceiver, and
    wherein in a low-power mode, the first transceiver operates in an off-state, no power or minimum power is supplied to the first transceiver operating in the off-state, the second transceiver operates in an on-state, power is supplied to the second transceiver operating in the on-state, the second transceiver is used to support the low-power mode, and the second transceiver operating in the on-state receives a wake-up radio (WUR) frame in the low-power mode.

2. The first communication node according to claim 1, wherein the one or more instructions are further executed to:
    perform a monitoring operation using the second transceiver within a time window; and
    transmit a first wake-up frame using the second transceiver when a second wake-up frame of a second communication node is not received by the monitoring operation.

3. The first communication node according to claim 2, wherein the time window is configured through negotiation between the first communication node and the second communication node.

4. The first communication node according to claim 1, wherein the one or more instructions are further executed to:
    perform a monitoring operation using the second transceiver within a time window; and
    transmit a data frame using the first transceiver without transmitting a first wake-up frame of the first communication node when a second wake-up frame of a second communication node is received by the monitoring operation.

5. The first communication node according to claim 4, wherein when the second wake-up frame is a valid wake-up frame, the transmission of the first wake-up frame is omitted, and wherein the valid wake-up frame is a wake-up frame for waking up a third communication node which is a destination of receiving the data frame.

6. The first communication node according to claim 5, wherein a criterion for determining the valid wake-up frame is a reception strength of the second wake-up frame.

7. The first communication node according to claim 1, wherein the one or more instructions are further executed to:
    perform a monitoring operation using the second transceiver within a time window; and
    transmit a first wake-up frame using the second transceiver to wake up a third communication node when a second wake-up frame of a second communication node received by the monitoring operation is not a valid wake-up frame for waking up the third communication node.

8. The first communication node according to claim 1, wherein the one or more instructions are further executed to perform a monitoring operation on the first channel using the second transceiver to receive the wake-up frame.

9. The first communication node according to claim 1, wherein the wake-up frame includes intelligent transportation system (ITS) information.

10. The first communication node according to claim 1, wherein the wake-up frame includes a legacy preamble and a payload, a bandwidth over which the legacy preamble is transmitted is 20 MHz, and a bandwidth over which the payload is transmitted is less than 20 MHz.

11. The first communication node according to claim 1, wherein the one or more instructions are further executed to:
    generate the wake-up frame including state of charge (SoC) level information;
    transmit the wake-up frame to a second communication node by using the second transceiver; and
    transmit a data frame to the second communication node by using the first transceiver.

12. The first communication node according to claim 11, wherein the data frame is transmitted when a poll frame indicating that the second communication node operates in a wake-up state is received.

13. The first communication node according to claim 12, wherein the poll frame indicates that a vehicle in which the second communication node is located operates in a sleep state or wake-up state.

14. The first communication node according to claim 1, wherein the one or more instructions are further executed to:
    receive the wake-up frame from a second communication node through the second transceiver;
    compare an SoC level indicated by the wake-up frame with a battery charge level of a vehicle in which the first communication node is located; and
    when the battery charge level is below the SoC level, operate the first transceiver in the on-state.

15. The first communication node according to claim 14, wherein the one or more instructions are further executed to transmit a poll frame indicating that the first transceiver operates in the on-state to the second communication node.

16. The first communication node according to claim 14, wherein when the battery charge level exceeds the SoC level, the first transceiver maintains the off-state.

* * * * *